(12) United States Patent
Konoshima et al.

(10) Patent No.: US 6,911,920 B2
(45) Date of Patent: Jun. 28, 2005

(54) HIERARCHICAL ENCODING AND DECODING DEVICES

(75) Inventors: Makiko Konoshima, Kawasaki (JP); Yosuke Yamaguchi, Yokohama (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/935,315

(22) Filed: Sep. 8, 2004

(65) Prior Publication Data

US 2005/0030205 A1 Feb. 10, 2005

Related U.S. Application Data

(63) Continuation of application No. PCT/JP02/02576, filed on Mar. 19, 2002.

(51) Int. Cl.[7] ............................................. H03M 7/00
(52) U.S. Cl. ............................ 341/50; 341/67; 341/59
(58) Field of Search ........................... 341/59, 50, 67; 382/240, 239

(56) References Cited

U.S. PATENT DOCUMENTS

| | | | |
|---|---|---|---|
| 4,734,767 A | | 3/1988 | Kaneko et al. ............. 358/133 |
| 4,908,862 A | | 3/1990 | Kaneko et al. ............. 380/28 |
| 5,243,420 A | | 9/1993 | Hibi .......................... 358/136 |
| 5,963,257 A | * | 10/1999 | Katata et al. ............ 375/240.11 |
| 6,400,768 B1 | * | 6/2002 | Nagumo et al. ......... 375/240.18 |
| 6,442,297 B1 | * | 8/2002 | Kondo et al. ............. 382/240 |
| 6,546,142 B2 | * | 4/2003 | Katata et al. ............. 382/239 |
| 2004/0202246 A1 | * | 10/2004 | Watanabe et al. ...... 375/240.01 |

FOREIGN PATENT DOCUMENTS

| | | |
|---|---|---|
| EP | 0 239 076 A2 | 9/1987 |
| EP | 0 267 578 A1 | 5/1988 |
| EP | 0 474 100 A2 | 2/1992 |
| JP | 55-134576 | 10/1980 |
| JP | 62-222783 | 9/1987 |
| JP | 63-121373 | 5/1988 |
| JP | 63-215281 | 9/1988 |
| JP | 63-227271 | 9/1988 |
| JP | 5-56275 | 3/1993 |
| JP | 6-125543 | 5/1994 |
| JP | 9-172643 | 6/1997 |
| JP | 2000-22960 | 1/2000 |
| JP | 200-201353 | 7/2000 |

OTHER PUBLICATIONS

"International Organization for Standardisation ISO/IEC JTC 1/SC 29/WG 11 Coding of Moving Pictures and Audio", ISO/IEC 14496–2:1999/FDAM 4, dated Jan. 2001.

W. Li, Fellow, IEEE, "Overview of Find Granularity Scalability in MPEG–4 Video Standard", IEEE Transactions on Circuits and Systems for Video Technology, vol. 11, No. 3, Mar. 2001.

International Preliminary Examination Report corresponding to PCT/JP2002/002576 dated Dec. 2, 2004.

\* cited by examiner

*Primary Examiner*—Peguy JeanPierre
(74) *Attorney, Agent, or Firm*—Staas & Halsey LLP

(57) ABSTRACT

On the transmitter side, an enhancement layer is hierarchized by expanding a coefficient of orthogonal transformation to a plurality of bit planes or designating a coefficient position in a block. Then, only a coefficient in a position designated by coefficient position information is encoded and streaming distribution is performed. On the receiver side, the coefficient block is restored using the coefficient position information.

20 Claims, 35 Drawing Sheets

| 10 | 0  | 3 | 0 | 0 | 0  | 0  | 0 |
|----|----|---|---|---|----|----|---|
| 0  | -1 | 2 | 0 | 0 | 0  | 0  | 0 |
| 5  | 0  | 0 | 0 | 0 | 0  | 0  | 0 |
| 0  | 0  | 0 | 0 | 0 | 0  | 0  | 0 |
| 0  | 0  | 0 | 0 | 0 | 0  | 0  | 0 |
| 0  | 0  | 0 | 0 | 0 | 0  | 0  | 0 |
| 0  | 0  | 0 | 0 | 0 | 10 | 0  | 0 |
| 0  | 0  | 0 | 0 | 0 | 0  | 10 | 0 |

PRIOR ART

| 1 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 1 | 0 | 0 |
| 0 | 0 | 0 | 0 | 0 | 0 | 1 | 0 |

PRIOR ART

| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

F I G. 1 3

| 1→ | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

F I G. 1 5

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 1 | 0 | 0 |
| 0 | 0 | 0 | 0 | 0 | 0 | 1 | 0 |

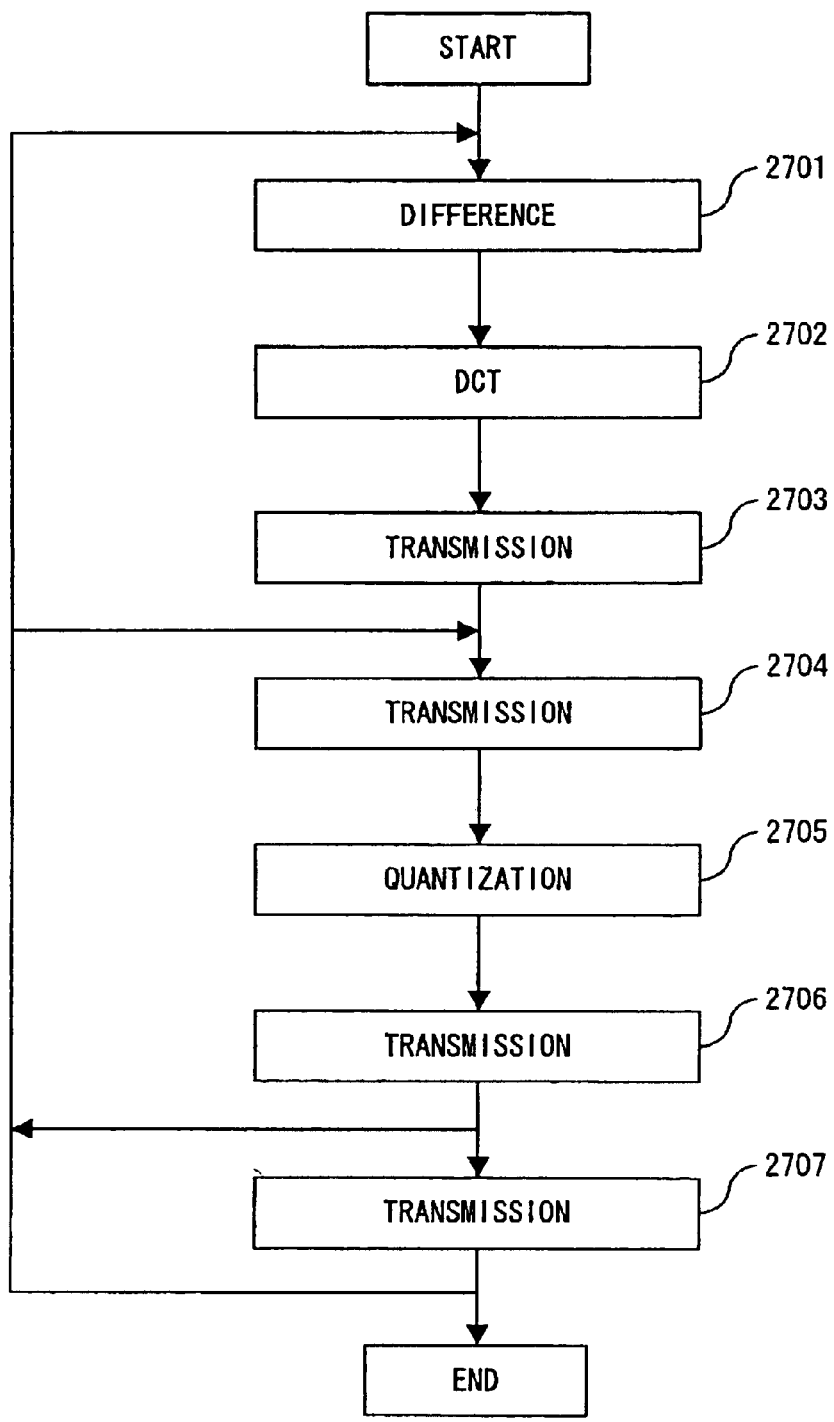
F I G. 27

| 0 | 0 | 0 | 0 | 0 | 0 | 0 | 0 |
|---|---|---|---|---|---|---|---|
| 0 | 0 | 0 | 0 | 0 | 0 | 0 | 10 |
| 0 | 0 | 0 | 0 | 0 | 0 | 10 | 0 |
| 0 | 0 | 0 | 0 | 0 | 0 | 0 | 0 |
| 0 | 0 | 0 | 0 | 0 | 0 | 0 | 0 |
| 3 | 2 | 0 | 0 | 0 | 0 | 0 | 0 |
| 0 | -1 | 0 | 0 | 0 | 0 | 0 | 0 |
| 10 | 0 | 5 | 0 | 0 | 0 | 0 | 0 |

3002:

| 0 | 0 | 0 | 0 | 0 | 0 | 0 | 0 |
|---|---|---|---|---|---|---|---|
| 0 | 0 | 0 | 0 | 0 | 0 | 0 | 10 |
| 0 | 0 | 0 | 0 | 0 | 0 | 10 | 0 |
| 0 | 0 | 0 | 0 | 0 | 0 | 0 | 0 |
| 0 | 0 | 0 | 0 | 0 | 0 | 0 | 0 |
| 70 | 1 | 0 | 0 | 0 | 0 | 0 | 0 |
| 0 | 0 | 0 | 0 | 0 | 0 | 0 | 0 |
| 3 | 0 | 30 | 0 | 0 | 0 | 0 | 0 |

...

3003:

| 0 | 0 | 0 | 0 | 0 | 0 | 0 | 0 |
|---|---|---|---|---|---|---|---|
| 0 | 0 | 0 | 0 | 0 | 0 | 0 | 10 |
| 0 | 0 | 0 | 0 | 0 | 0 | 10 | 0 |
| 0 | 0 | 0 | 0 | 0 | 0 | 0 | 0 |
| 0 | 0 | 0 | 0 | 0 | 0 | 0 | 0 |
| 37 | 27 | 0 | 0 | 0 | 0 | 0 | 0 |
| 0 | 1 | 0 | 0 | 0 | 0 | 0 | 0 |
| 15 | 0 | 2 | 0 | 0 | 0 | 0 | 0 |

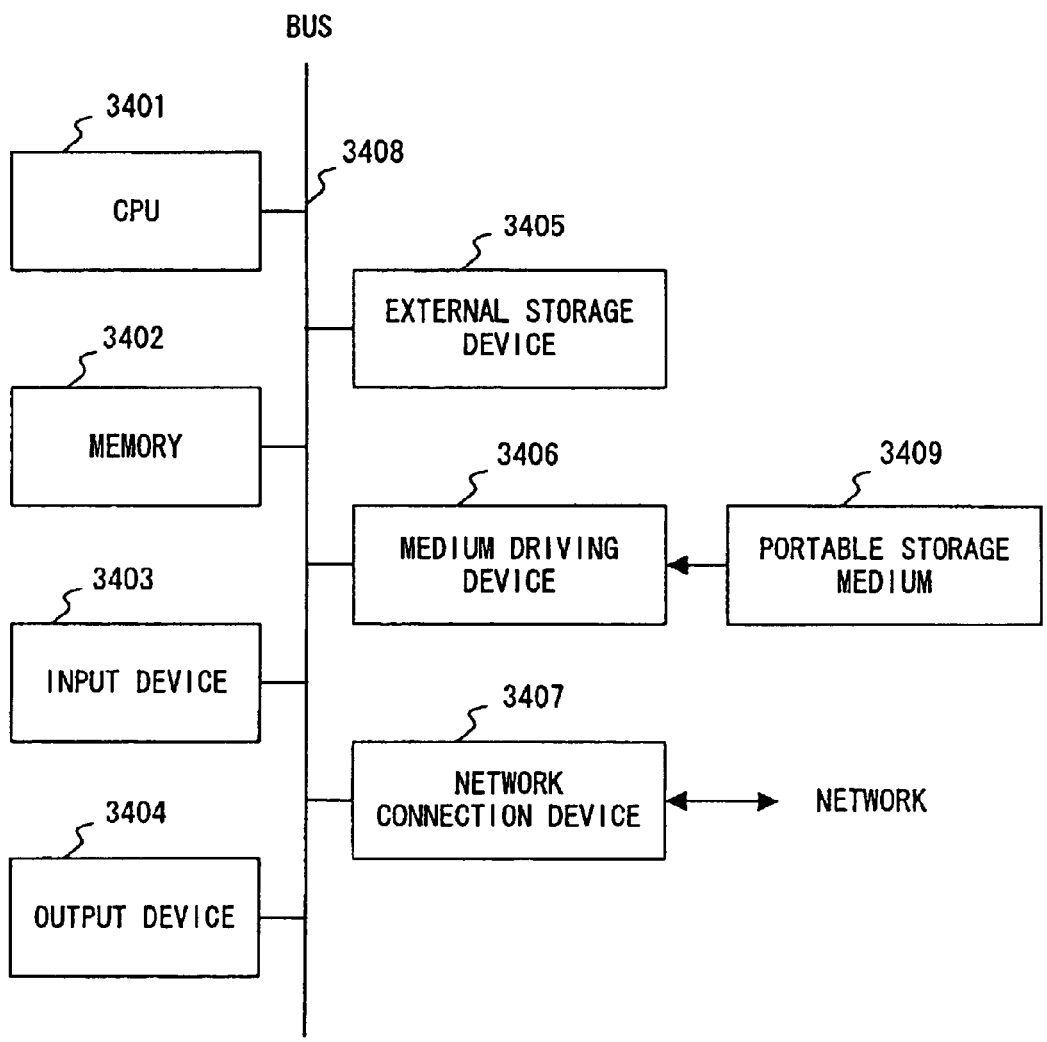
F I G. 3 4

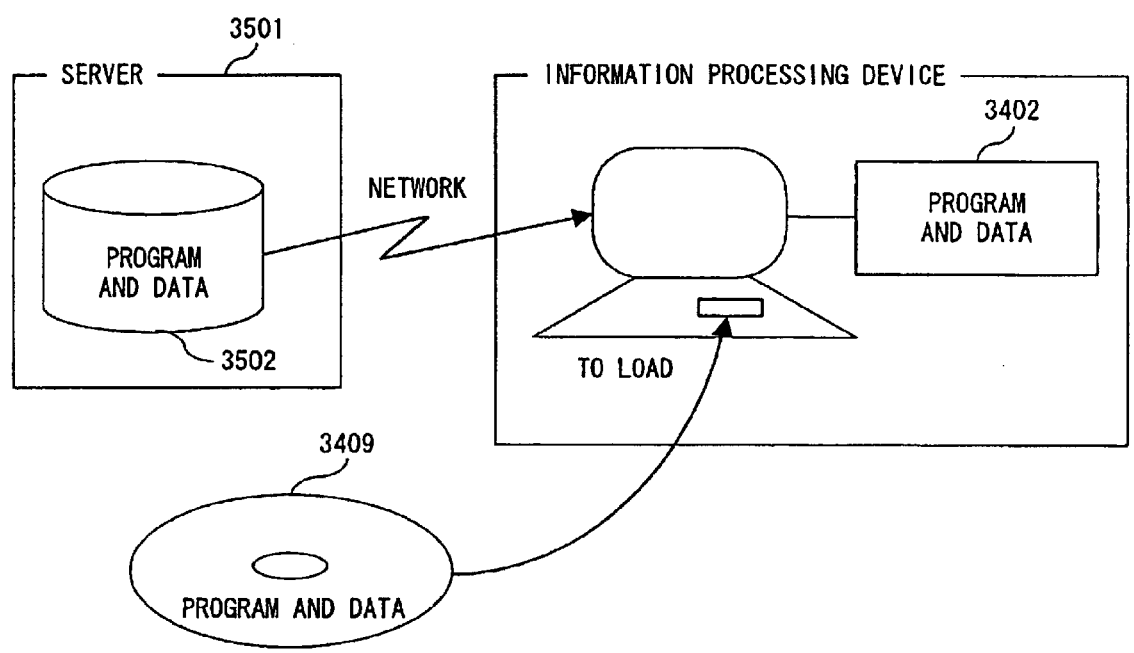
F I G. 35

HIERARCHICAL ENCODING AND DECODING DEVICES

CROSS REFERENCE TO RELATED APPLICATION

This application is a continuation of international PCT application No. PCT/JP02/02576 filed on Mar. 19, 2002.

BACKGROUND OF THE INVENTION

1. Field of the Invention

The present invention relates to the compression encoding and decoding of data, more particularly relates to a device for generating hierarchically encoded data and decoding the hierarchically encoded data in streaming distribution of data in accordance with an ever-changing bandwidth as in an IP (Internet protocol) network.

2. Description of the Related Art

FIGS. 1 and 2 show the respective configurations of a hierarchically encoding device conventionally used in the streaming distribution of moving pictures and its decoding device, respectively. The encoding and decoding devices are installed in the distribution device of moving pictures and its receiving device.

Firstly, on the encoder side, a base layer encoding unit 102 encodes an original picture 111, and generates the bit stream 121 of a base layer. In this case, the encoded data is simultaneously decoded and the decoded picture 113 is outputted. An enhancement layer encoding unit 101 encodes a difference between the decoded picture 113 and original picture 112, and generates the bit stream 122 of an enhancement layer. Although the original pictures 111 and 112 represent the substantially same contents, sometimes they are the same and sometimes they are different.

Then, on the decoder side, a base layer decoding unit 202 decodes the bit stream 121 of the base layer, and generates a decoded picture 212. An enhancement layer decoding unit 201 decodes the bit stream 122 of the enhancement layer. The final decoded picture 212 of the enhancement layer is obtained by adding the decoding result of the base layer to the decoded picture obtained only from the enhancement layer.

As its typical example, there is an ISO/IEC (International Organization for Standardization/Internal Electro-technical Commission) 14496-2: 1999/FDAM 4 (Final Draft Amendment 4). This is an encoding/decoding method specified in the standard specification document of MPEG-4 (Moving Picture Experts Group phase 4) Visual Streaming Profile (accurately, the difference draft of the specification document of MPEG-4 Visual).

According to this specification, discrete cosine transform (DCT) is applied to the difference between the decoded picture 113 generated from the encoded picture of the base layer and the original picture 112, and a plurality of bit planes ranging from an MSG (most significant bit) to a LSB (least significant bit) are generated using each coefficient of the transform result. Then, each bit plane is used as each hierarchical-level data in the enhancement layer. At the time of network transmission, the amount of data can be adjusted by sequentially transmitting data from the MSG side in accordance with its bandwidth.

FIG. 3 is a flowchart showing the encoding process of such an enhancement layer. The encoding device firstly calculates in advance a difference value U for each pixel, between the original picture 112 and decoded picture 113 from the base layer encoding unit 102, and stores it (301).

Then, the encoding device divides U into blocks to obtain hierarchical-level data, and prepares for hierarchizing each coefficient as a bit plane, by applying a DCT to each block (302).

Then, both a frame synchronous bit and a bit k indicating the possibility of a bit shift in the hierarchical level are transmitted as the header information of a frame (303). If k is 1, the bit shift is possible, and if k is 0, the bit shift is impossible. Then, both a hierarchical-level synchronous bit and hierarchical level identifier (hierarchical level number) are transmitted, and the bit plane of the hierarchical level is shifted (304).

Then, a run-length code is detected from the block using the shifted bit plane, and the validity/invalidity of the block is determined. A run-length code is represented by the combination of a zero run-length RUN and an EOP. (end of plane) indicating whether the corresponding bit is the last asserted bit of the block. If it corresponds to the last non-zero bit of the block, its EOP becomes 1.

Then, both a bit indicating the validity/invalidity of a macro-block and the validity/invalidity of a block are transmitted (306), based on the determination result in 305. If each of these bits is 1, it is indicated that it is valid, and if it is 0, it is indicated that it is invalid. If the bit indicating the block validity/invalidity and k both are 1, a bit z indicating the amount of shift of the bit plane is transmitted.

Then, if all processed hierarchical levels corresponding to the same position as a block to be processed are invalid, a bit (flag) indicating invalidity is transmitted (307). Then, variable-length encoding is applied to the run length code detected in 305, and its code bit is transmitted (308). In this case, a sign bit indicating the plus/minus sign is also encoded together.

The processes in 307 and 308 are repeated for each block, and the processes in 306 through 308 are repeated for each macro-block. The processes in 304 through 308 are repeated for each hierarchical level from the MSB side, and the processes in 301 through 308 are repeated for each frame.

If in 306, the block is invalid, the processes in 307 and 308 are skipped. If in 307, all processed hierarchical levels are invalid, and the block to be processed is also invalid, the process in 308 is skipped. Thus, a bit stream as shown in FIG. 4 is generated and is transmitted to the receiving device.

FIG. 5 shows an example of DCT coefficient bit-plane generation, including an extract from the following reference.

"Overview of Fine Granularity Scalability in MPEG-4 Video Standard" IEEE Trans. On Circuits and Systems for Video Technology, Vl.11 No. 3, March 2001, pp.301–317.

The encoding device firstly one-dimensionally expands a coefficient by zigzag scanning the coefficient. In this case, the absolute value 501 of each coefficient is binarized, and a sign bit 502 is added to the binarized absolute value. In this case, since the absolute value can be expressed by four bits, it is expanded into a four-layered bit plane 503, and a variable length code (VLC) 504 is generated for each bit plane.

In this example, a two-dimensional VLC obtained by encoding a symbol (RUN, EOP) is used. When calculating a VLC, a sign bit is added to the MSB of the coefficient as one bit code. The decoding device performs the operation of the reversal of encoding, and obtains a DCT coefficient by sequentially adding up the bit-plane bit of each hierarchical level.

FIGS. 6 through 8 show examples of the encoding of a specific block. If in 302 of FIG. 3, block coefficients as shown in FIG. 6 are obtained, they are expanded to the four-layered bit planes shown in FIG. 7. In this case, if as shown in FIG. 8, the bit plane of the MSB is zigzag scanned, three of (0, 0), (54, 0) and (5, 1) are detected as (RUN, EOP). In this case, the sign bit is also simultaneously detected. The same process is applied to the bit planes of other hierarchical levels, and a code corresponding to each (RUN, EOP) is transmitted.

However, on the decoder side, (RUN, EOP) is obtained by decoding the received code, and bit planes as shown in FIG. 7 are generated from the obtained data and by the zigzag scan. In this example, since the bit plane of MSB corresponds to the fourth bit from LSB, a value obtained by shifting the bit plane leftward by four bits is stored as block data. Similarly, the bit planes of MSB-1 and MSB-2 are obtained by shifting them leftward by three bits and two bits, respectively, and are stored. As a result of such a bit shift, the four-layered bit planes shown in FIG. 9 can be generated, and adding up these bit planes, the coefficients shown in FIG. 6 are restored. Although in this example, the process for one block was described, in reality, the same process is applied to all blocks in one frame.

In such a hierarchical encoding, a bit plane on the LSB side is more detailed information in an enhancement layer, and its priority is low, compared with a bit plane on the MSB side. Therefore, if a bit rate must be reduced at the time of bit stream transmission, the transmission of a bit plane closest to the LSB side can be sequentially cancelled in the first place.

Although this method is contrived so that a code in MSB and ones in hierarchical levels other than MSB may be different, this is an encoding method using no correlation between hierarchical levels in the calculation process. Nevertheless, if information about the MSB side lacks, a sign bit cannot be detected, which is a problem.

Since in the conventional encoding method, a bit is generated due to variable-length encoding depending on both the number of bit planes and that of coefficients (including run length), encoding efficiency greatly degrades, compared with that of base-layer encoding, which is a problem. Since correlation between hierarchical levels is not utilized, encoding efficiency far more degrades.

SUMMARY OF THE INVENTION

It is an object of the present invention to provide hierarchical encoding/decoding devices for improving encoding efficiency in streaming distribution of moving pictures and the like.

It is considered to be the cause of encoding efficiency degradation in the conventional encoding method that the available pattern of a symbol (RUN, EOP) that is generated in encoding covers all coefficient areas in a block. For this reason, a lot of variable length codes must be prepared, and accordingly, the average length of a code to be used becomes long.

Therefore, in the present invention, the number of types of variable length codes to be used is reduced by restricting the position of a coefficient to be encoded, using coefficient position information. Thus, the number of bits of the entire variable length code can be reduced, and accordingly, encoding efficiency can be improved.

Each of the first, second and third hierarchical encoding device of the present invention encodes and transmits data in a first layer. In the second layer, the hierarchical encoding device calculates difference data between the decoded data of the first layer and a predetermined data, divides the difference data into a plurality of blocks, calculates a coefficient for each block by applying orthogonal transformation to the data, and encodes and transmits the coefficient.

The first and second layers, for example, correspond to base and enhancement layers, respectively, and the decoded data of the first layer and the predetermined data, for example, correspond to the decoded picture 113 and original picture 112, respectively, shown in FIG. 1.

A first hierarchical encoding device comprises a bit-plane generation unit, an encoding unit and a transmitting unit. The bit-plane generation unit hierarchizes the second layer by expanding a coefficient into a plurality of bit planes. The encoding unit encodes a bit value in a coefficient position in a range designated by coefficient position information of one hierarchical level in the second layer, in a bit plane in the hierarchical level, and generates a code. The transmitting unit transmits both the coefficient position information and code.

The bit-plane generation unit, for example, corresponds to the bit-plane generation unit 1801 shown in FIG. 18, which is described later. The encoding unit, for example, corresponds to the run-length detection unit 1802, run-length encoding unit 1803 and code generation unit 1805 all shown in FIG. 18. The transmitting unit, for example, corresponds to the code generation unit 1805 shown in FIG. 18.

A second hierarchical encoding device comprises a bit-plane generation unit, an encoding unit and a transmitting unit. The bit-plane generation unit hierarchizes the second layer by expanding a coefficient into a plurality of bit planes. The encoding unit detects a bit value in a coefficient position designated by coefficient position information of one hierarchical level of the second layer, in a bit plane of each block of the hierarchical level, applies run-length encoding to the bit values detected from a plurality of blocks and generates a code. The transmitting unit transmits both the coefficient position information and code.

The bit-plane generation unit, for example, corresponds to the bit-plane generation unit 2501 shown in FIG. 25, which is described later. The encoding unit, for example, corresponds to the run-length detection unit 2503, run-length encoding unit 2504 and code generation unit 2506 all shown in FIG. 25. The transmitting unit, for example, corresponds to the code generation unit 2506 shown in FIG. 25.

A third hierarchical encoding device comprises a quantization unit, an encoding unit and a transmitting unit. The quantization unit extracts a value in a coefficient position designated by the coefficient position information of one hierarchical level in the second layer, from each block of the hierarchical level of the second layer hierarchized by designating a coefficient position in a block and quantizes it. The encoding unit encodes the quantized value to generate a code. The transmitting unit transmits both the coefficient position information and code.

The quantization unit, for example, corresponds to the quantization unit 3202 shown in FIG. 32, which is described later. The encoding and transmitting units, for example, correspond to the code generation unit 3205 shown in FIG. 32.

Each of the first, second and third decoding devices of the present invention receives and decodes data in the first layer, receives and decodes data in the second layer, performs an inversion of the orthogonal transformation for obtained coefficients, for each block, and adds a transformation result to the decoding result of the first layer.

Data received in the first and second layers, for example, corresponds to the bit streams 121 and 122, respectively. Data obtained by adding up the transform result of the second layer and the decoding result of the first layer, for example, corresponds to the decoded picture 212 shown in FIG. 2.

A first decoding device comprises a receiving unit, a decoding unit, a bit-plane generation unit and a restoration unit. The receiving unit receives both coefficient position information and a code in one hierarchical level of the second layer hierarchized by expanding a coefficient into a plurality of bit planes. The decoding unit decodes the code. The bit-plane generation unit generates a bit value in a range designated by the coefficient position information using the decoding result in a bit plane of the hierarchical level of the second layer, and generates the bit plane of the hierarchical level by setting bit values out of the designated range to 0. The restoration unit sequentially adds up the bit plane of each hierarchical level of the second layer to restore a coefficient block.

The receiving unit and decoding unit, for example, corresponds to the code decoding unit 1901 shown in FIG. 19, which is described later. The bit-plane generation unit, for example, corresponds to the bit-plane generation unit 1902 shown in FIG. 19, and the restoration unit, for example, corresponds to the memory 1904 shown in FIG. 19.

A second decoding device comprises a receiving unit, a decoding unit, a bit-plane generation unit and a restoration unit. The receiving unit receives both coefficient position information and a code in one hierarchical level of the second layer hierarchized by expanding a coefficient into a plurality of bit planes. The decoding unit applies run-length decoding to codes to generate decoding results of a plurality of blocks of the hierarchical level in the second layer. The bit-plane generation unit generates a bit value in a coefficient position designated by the coefficient position information using the decoding result in a bit plane of each block in the hierarchical level of the second layer, and generates the bit plane of each block in the hierarchical level by setting bit values in coefficient positions other than the designated one to 0. The restoration unit sequentially adds up the bit plane of each hierarchical level of the second layer to restore a coefficient block.

The receiving unit and decoding unit, for example, corresponds to the code decoding unit 2601 shown in FIG. 26, which is described later. The bit-plane generation unit, for example, corresponds to the bit-plane generation unit 2603 shown in FIG. 26, and the restoration unit, for example, corresponds to the memory 2605 shown in FIG. 26.

A third decoding device comprises a receiving unit, a decoding unit, a block generation unit and a restoration unit. The receiving unit receives both coefficient position information and a code in one hierarchical level of the second layer hierarchized by expanding a coefficient into a plurality of bit planes. The decoding unit decodes and dequantizes the code. The block generation unit generates a value in the coefficient position designated by the coefficient position information using the dequantization result, and generates each block of the hierarchical level, by setting values in coefficient positions other than the designated one to 0. The restoration unit sequentially adds up the block of each hierarchical level in the second layer to restore a coefficient block.

The receiving unit and decoding unit, for example, correspond to the code decoding unit 3301 shown in FIG. 33, which is described later. The block generation unit, for example, corresponds to the block generation unit 3302. The restoration unit, for example, corresponds to the memory 3303 shown in FIG. 33.

BRIEF DESCRIPTION OF THE DRAWINGS

FIG. 6 shows the coefficient of one block;

FIG. 7 shows four-layered bit planes;

FIG. 8 shows the zigzag scan of a bit plane;

FIG. 9 shows shifted bit planes;

FIG. 13 shows a coefficient position in a block;

FIG. 15 shows a zigzag scan in the designated range;

FIG. 16 shows the second designated range in a bit plane;

FIG. 27 is a flowchart showing the third encoding process;

FIG. 30 shows the coefficient blocks of one frame;

FIG. 34 shows the configuration of an information processing device; and

FIG. 35 shows examples of storage media.

DESCRIPTION OF THE PREFERRED EMBODIMENTS

Figure 1:
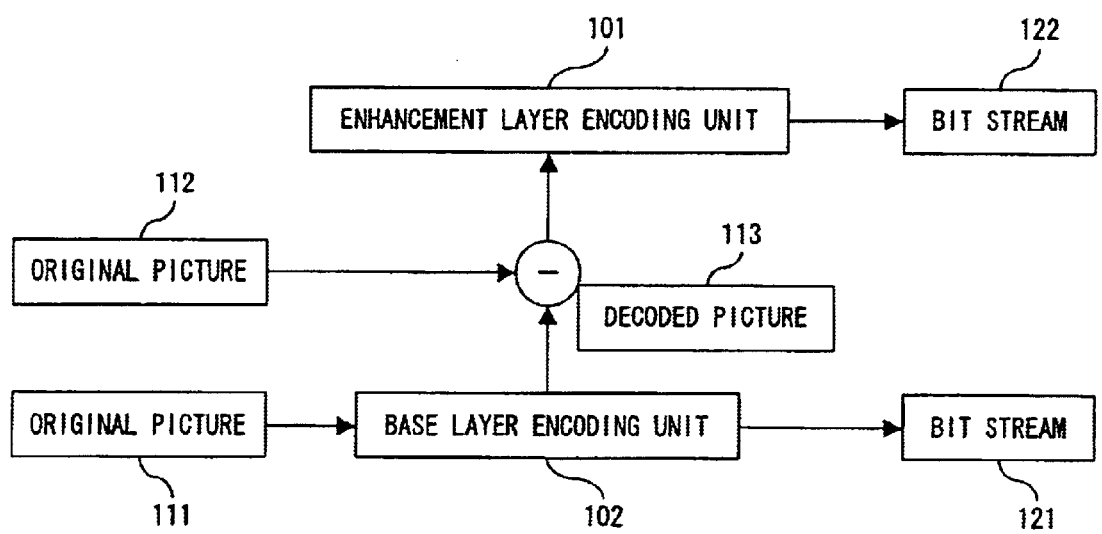
FIG. 1 shows the configuration of the conventional encoding device.
Figure 2:
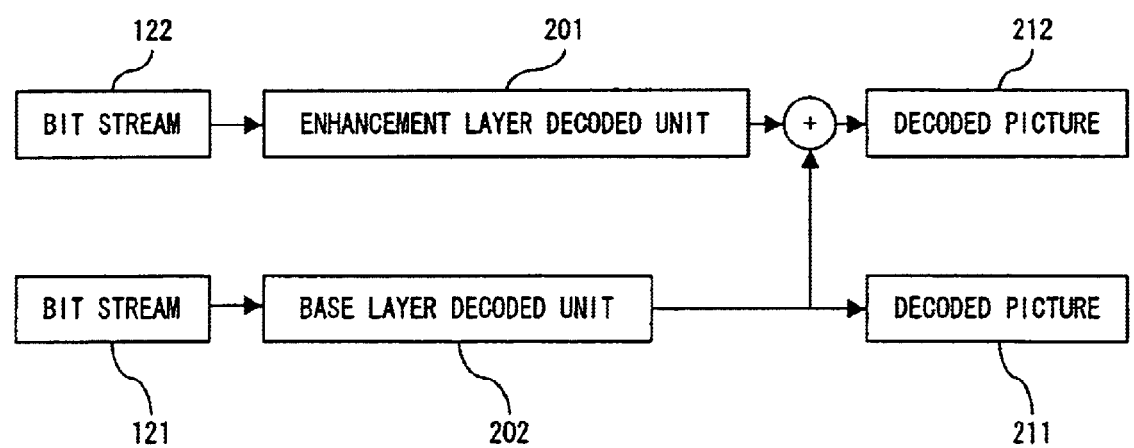
FIG. 2 shows the configuration of the conventional decoding device.

The preferred embodiments of the present invention are described in detail below with reference to the drawings.

This preferred embodiment adopts a hierarchical encoding method composed of a plurality of hierarchical levels including a base layer (one layer) and an enhancement layer (a plurality of layers). In the enhancement layer, difference data between the original picture of the base layer and a predetermined original picture is calculated, the calculated difference data is divided into a plurality of areas, that is, blocks, and transform coefficients are calculated for each area by applying orthogonal transformation, such as a DCT or the like, to each area.

As the hierarchical encoding/decoding method of the calculated coefficient, the following three algorithms are adopted.

(1) A first encoding/decoding method

On the encoder side, a coefficient is hierarchized by expanding the coefficient into bit planes, and information (bit string) for designating the range of coefficients located in the coefficient bit plane of a specific hierarchical level in the enhancement layer in advance is added to a bit stream in predetermined encoding units.

On the decoder side, the coefficient bit is decoded based on the bit string, according to information about the designated range, setting coefficient bits out of the designated range to 0. Then, inversion, such as a DCT or the like, is applied after sequentially adding up the decoding result of each hierarchical level, and the output restoration picture (difference value) of the enhancement layer, to be added to the output restoration picture of the base layer is calculated.

(2) A second encoding/decoding method

On the encoder side, a coefficient is hierarchized by expanding the coefficient into bit planes, and information (bit string) for designating the position of a coefficient located in the coefficient bit plane of a specific hierarchical level in the enhancement layer in advance is added to a bit stream in predetermined encoding units. Then, one frame is divided into two blocks; one block in which 1 is generated and the other block in which 0 is generated, and run-length encoding is applied to the blocks.

On the decoder side, run-length decoding is applied to the blocks, and the coefficient bit in the designated position in the block of the hierarchical level and all the remaining coefficient bits are set to 1 and 0, respectively. Then, inversion is applied after sequentially adding up the decoding result of each hierarchical level, and the output restoration picture of the enhancement layer is calculated.

(3) A third encoding/decoding method

On the encoder side, a coefficient is hierarchized by expanding the coefficient into frequency positions, and both information (bit string) for designating the position of a coefficient of a specific hierarchical level in the enhancement layer in advance and quantization information of the hierarchical level are added to a bit stream in predetermined encoding units.

On the decoder side, the bit string is detected, and the coefficient in the designated position of each block in one frame is decoded and all coefficients in positions other than the designated one are set to 0, inversion is applied after sequentially adding up the decoding result of each hierarchical level, and the output restoration picture of the enhancement layer is calculated.

Next, the first encoding/decoding method is described in detail with reference to FIGS. 10 through 19.

Figure 10:
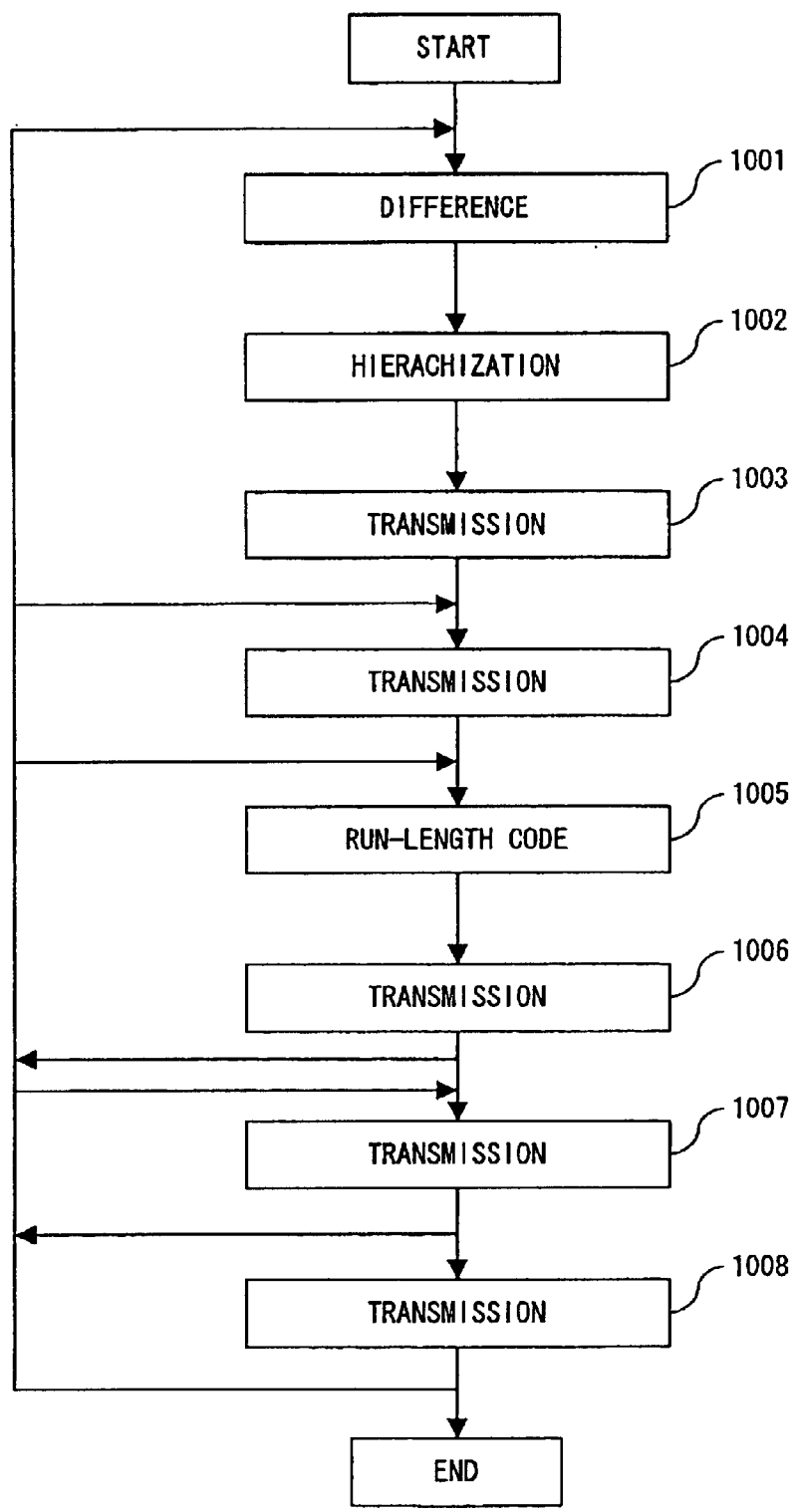
FIG. 10 is a flowchart of the first encoding process.

FIG. 10 is a flowchart showing the first encoding process. In FIG. 10, processes in 1001 through 1003 and 1007 are the same as those in 301 through 303 and 307, respectively, shown in FIG. 3.

In 1004, the encoding device transmits both a hierarchical-level synchronous bit and a hierarchical-level identifier (hierarchical-level number) and shifts the bit plane of the hierarchical level. Simultaneously, the encoding device transmits information about coefficient positions available in the hierarchical level, as the header information of a frame. This coefficient position information designates one or more coefficient positions in a bit plane, and can also designate the range of coefficients.

Then, using the shifted bit plane, the run-length code of a block in a position range designated by the coefficient position information is detected, and the respective validity/invalidity of a macro-block and a block are determined (1005). Then, a macro-block valid/invalid bit, a block valid/invalid bit and a bit z indicating the amount of shift of a bit plane are transmitted (1006). This bit z is added to the header information of a block or a frame.

Figure 3:
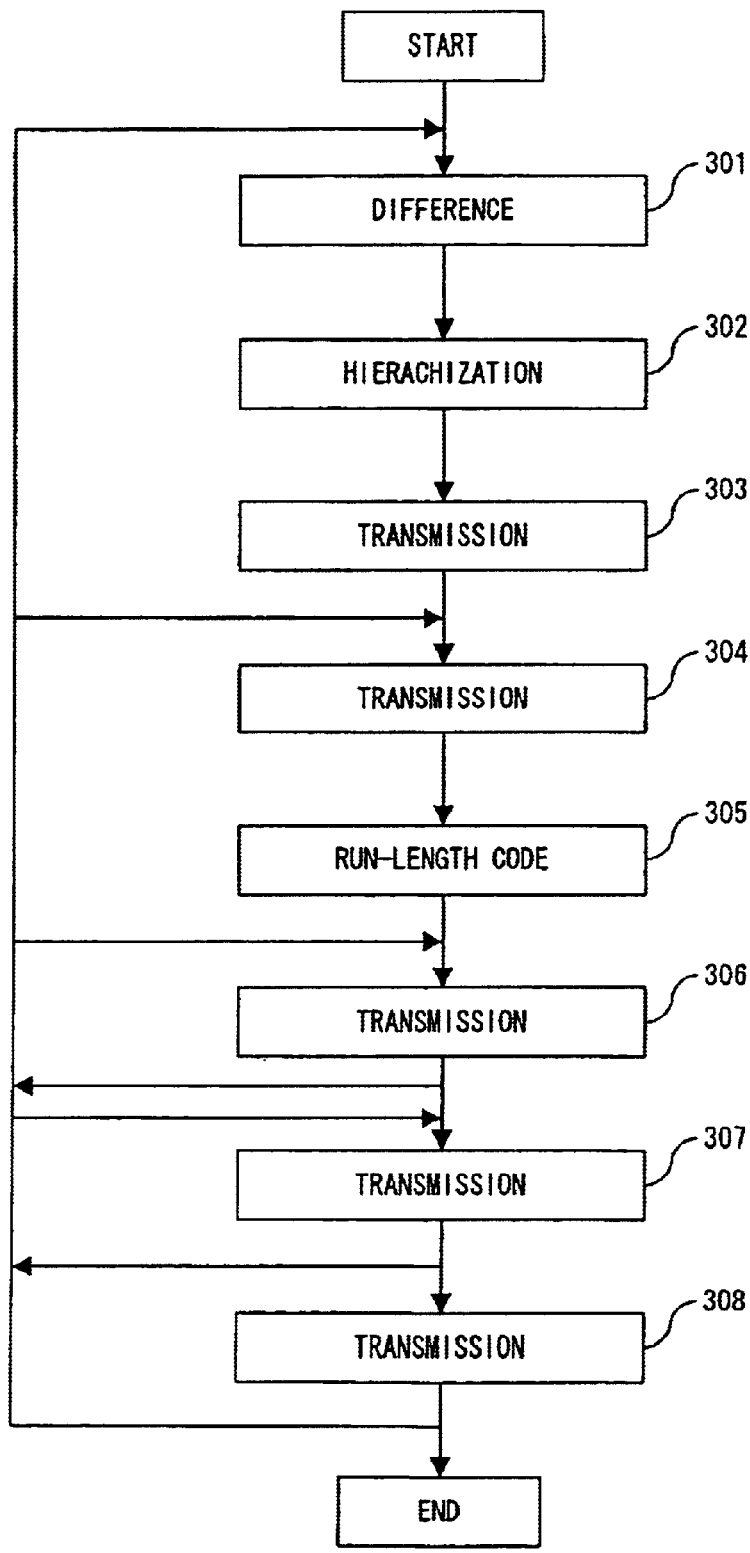
FIG. 3 is a flowchart showing the conventional encoding process.
Figure 4:
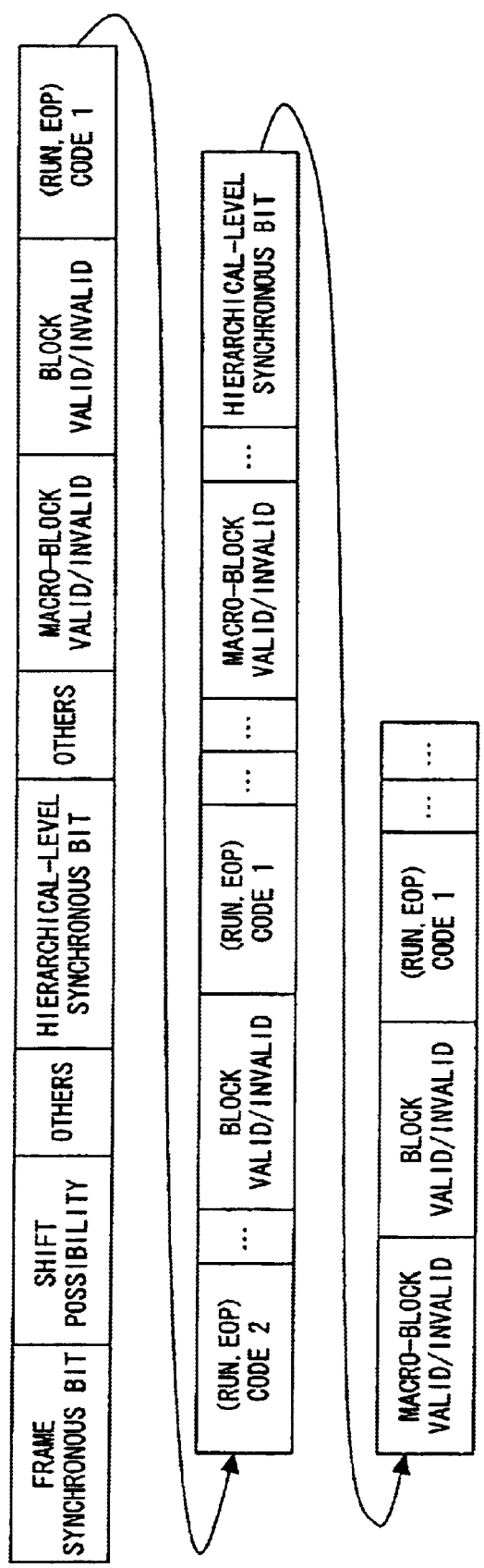
FIG. 4 shows the conventional bit stream.
Figure 5:
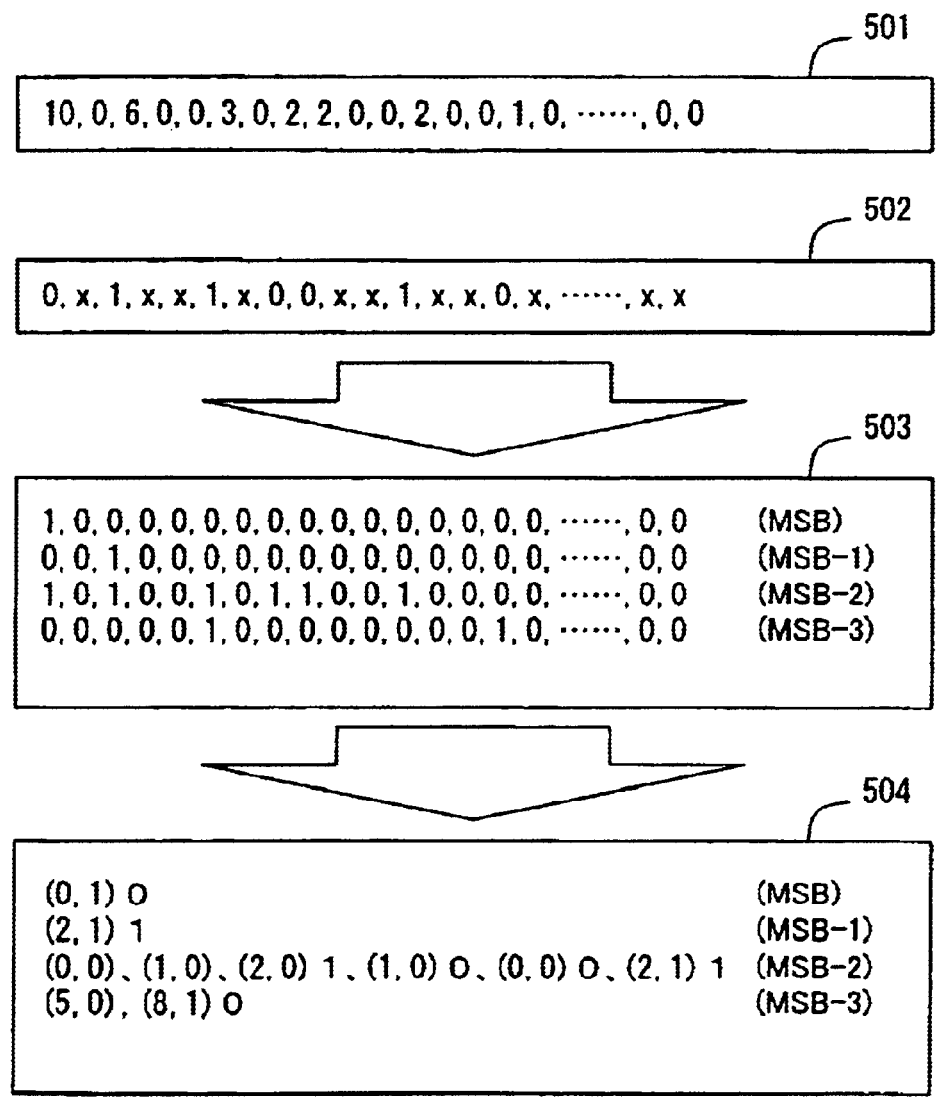
FIG. 5 shows the coefficient bit-plane generation.

In 1008, as in 308 shown in FIG. 3, although a variable-length code is transmitted, its run-length is limited. Therefore, the average length of the code becomes shorter than ever.

The processes in 1007 and 1008 and those in 1005 through 1008 are repeated for each block and macro-block, respectively. The processes in 1004 through 1008 and those in 1001 through 1008 are repeated from the MSB side for each hierarchical level and frame, respectively.

If in 1006, the block is invalid, the processes in 1007 and 1008 are skipped. If in 1007, all processed hierarchical levels are invalid and if a block to be processed is also invalid, the process in 1008 is skipped.

Figure 11:
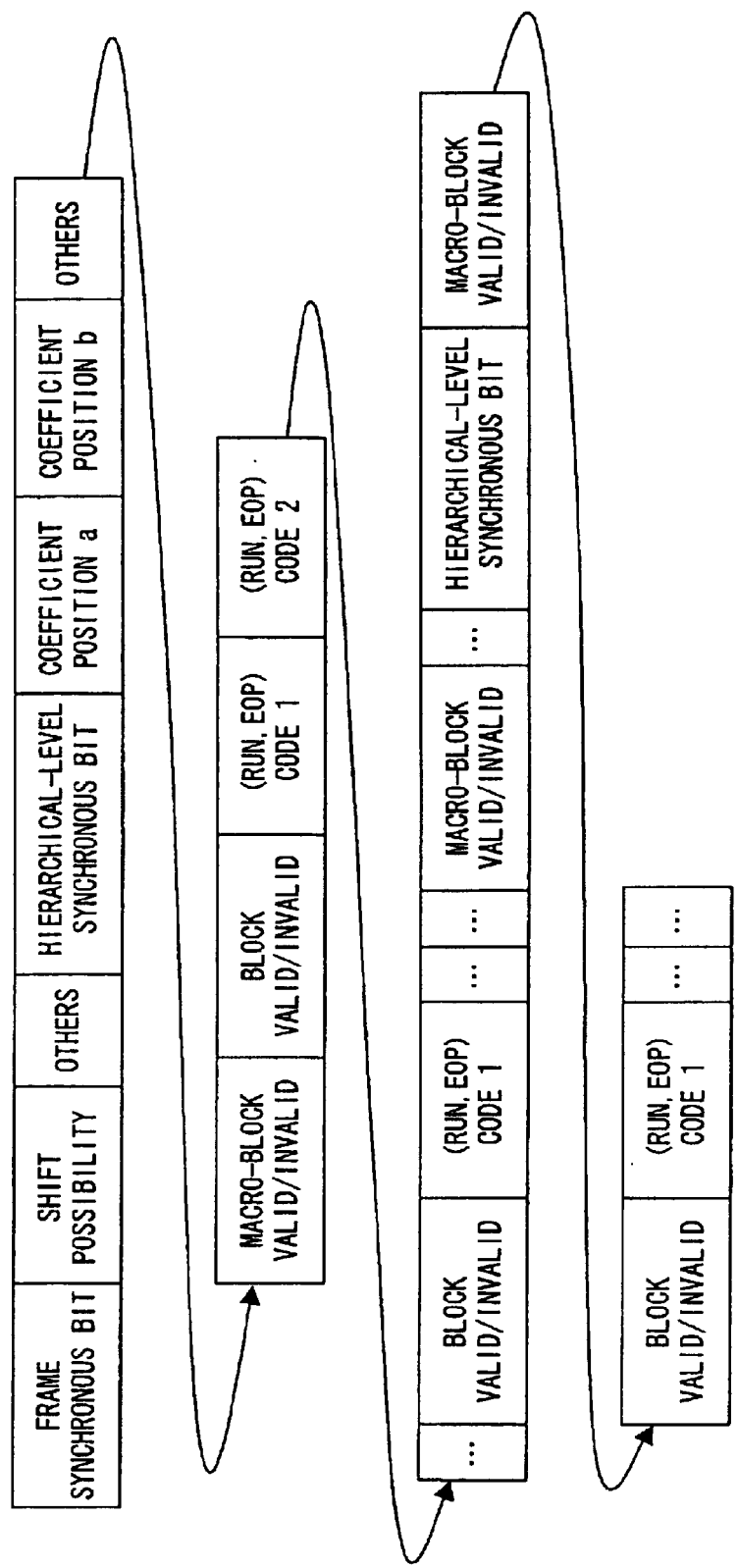
FIG. 11 shows a bit stream in the first encoding.

Thus, a bit stream, for example, shown in FIG. 11, is generated and transmitted to the receiving device. In FIG. 11, coefficient positions a and b correspond to the coefficient position information, and indicates both the start and end positions of a designated range, respectively.

According to such an encoding process, the number of generated variations of a run-length code can be restricted by limiting the coefficient position range of a bit plane in each hierarchical level. Therefore, a short code bit can be assigned to each run-length code, and as a result, encoding efficiency can be improved.

Figure 12:
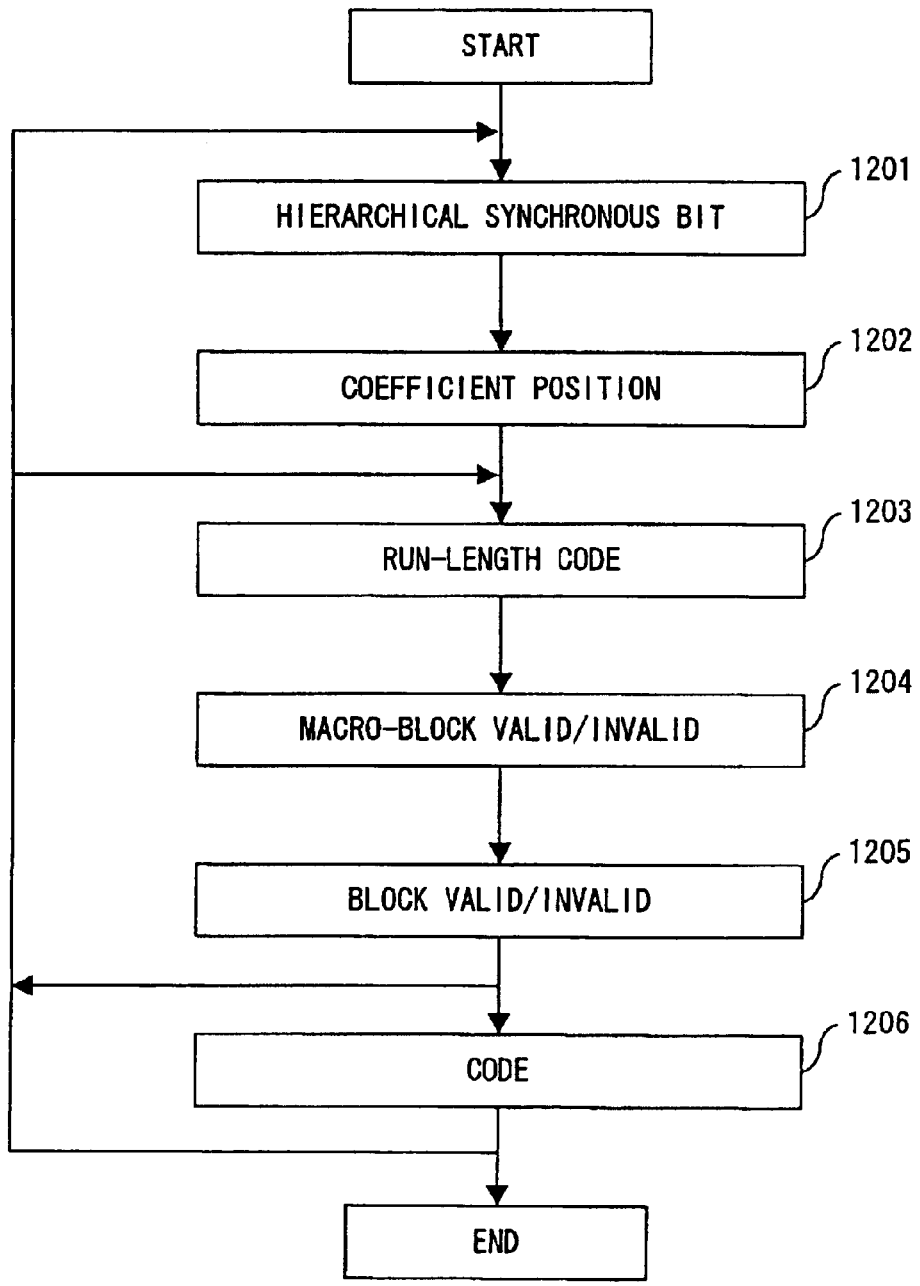
FIG. 12 is a flowchart showing details of the first encoding process.

FIG. 12 is a flowchart showing the detailed processes in 1004 through 1008. The encoding device firstly transmits a hierarchical-level synchronous bit (including a hierarchical-level number)(1201). In an example following the framework of the current hierarchical encoding in MPEG-4, for example, a hierarchical-level synchronous bit of 0×0140–0×015F (32 bits) is added to a bit stream. Out of 32 bits, five lower-order bits indicate the priority of a hierarchical level.

Then, the coefficient position information of the hierarchical level is transmitted as part of the header information of a frame (1202). If a number (0–63) indicating the order of zigzag scan shown in FIG. 13 is used, for example, the start position number (6 bits) and end position number (6 bits) of a designated coefficient position range are added to a bit stream as its coefficient position information. The start and end position numbers correspond to the coefficient positions a and b, respectively, shown in FIG. 11.

In FIG. 13, coefficient positions in a block, obtained when 64 coefficients are obtained by applying orthogonal transformation to a block of 8×8 pixels are shown as an example. In this case, the left upper and right lower corners correspond to low and high frequency elements, respectively. In this example, although a continuous area in a block is designated as a coefficient position range, a plurality of discrete areas can also be designated as a coefficient position range.

Then, in the bit plane of the hierarchical level, two-dimensional run-length encoding is applied only to the range designated by the coefficient position information (1203). If the start and end position numbers are designated, only an area between the positions are encoded into run-length codes. In this case, since the target range of run-length encoding is restricted, codes become shorter than ever, and accordingly, encoding efficiency can be improved.

Then, a macro-block valid/invalid bit is transmitted (1204). If the hierarchical level can be shifted, variable-length encoding is applied to a bit number to be shifted in accordance with the specification of MPEG-4, and the encoded bit number is transmitted.

Then, block validity/invalidity is determined, and a block validity/invalidity bit is transmitted as part of a block header (1205). If in 1203, all bits are zero, the block is invalid. Therefore, one bit indicating invalidity is transmitted.

Then, variable-length encoding is applied to the run-length code obtained in 1203, and code bits are transmitted (1206). For the code, a publicly known Huffman code, universal code, arithmetic code or the like is used.

The processes in 1203 through 1206 and those in 1201 thorough 1206 are repeated for each macro-block and hierarchical level, respectively. If in 1205, the block is invalid, the process in 1206 is skipped.

Although in this example, one type of coefficient position information is set for one bit plane, two or more types of coefficient position information can also be set. In this case, codes generated from different segments of coefficient information for the same bit plane are transmitted as the picture information of different hierarchical levels, and the bit plane is further divided into a plurality of hierarchical levels.

Figure 7:
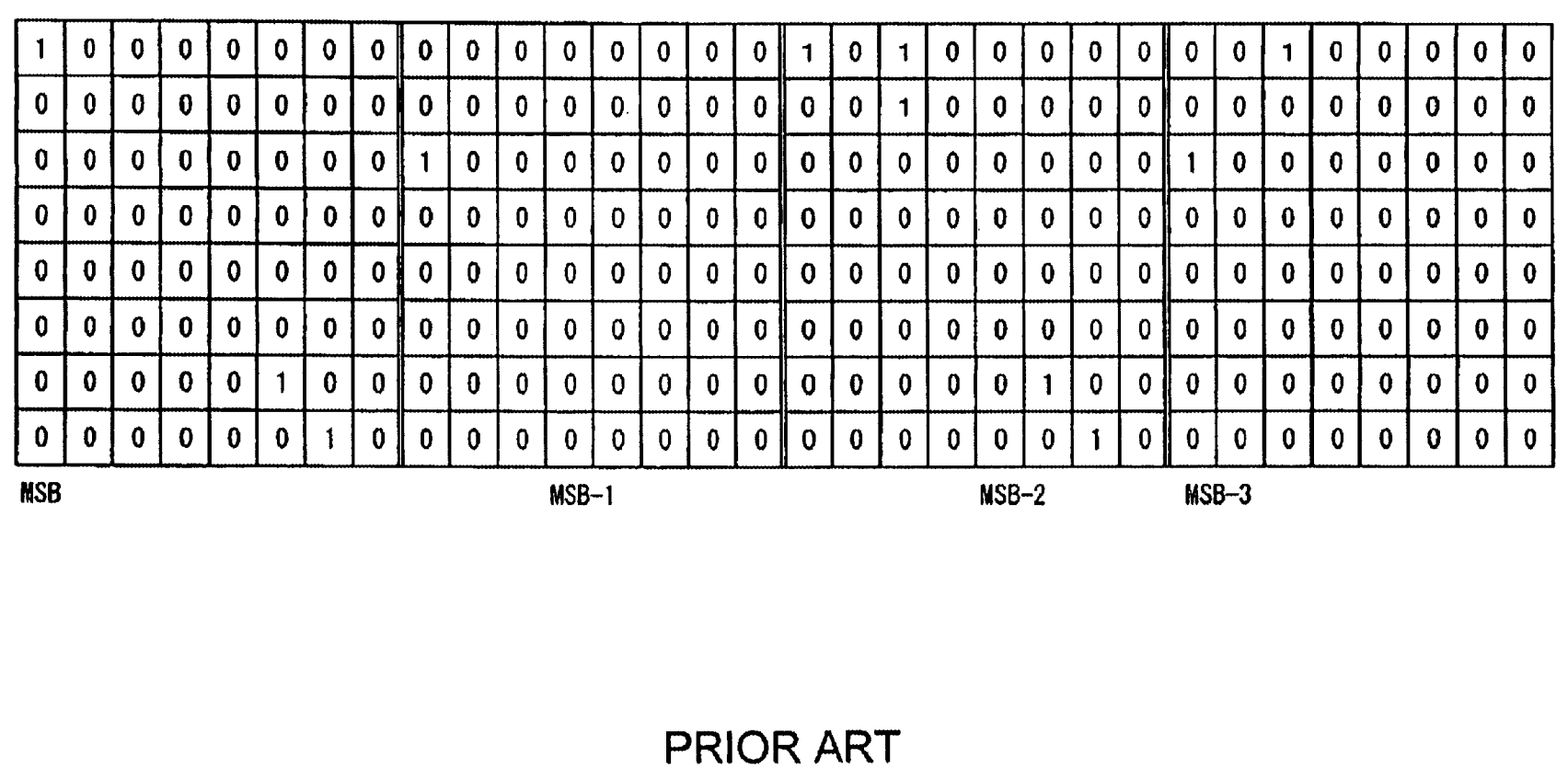
Figure 14:
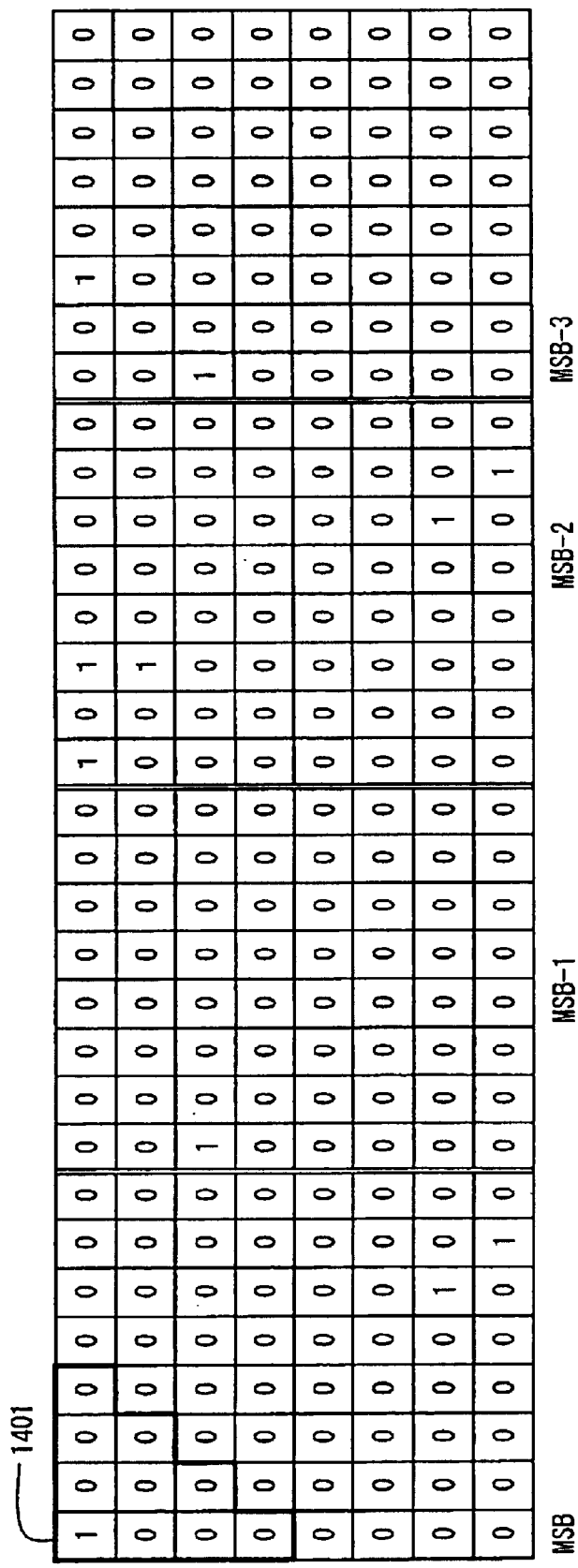
FIG. 14 shows the first designated range in a bit plane.

FIGS. 14 through 16 show examples of the block encoding shown in FIG. 6. It is, for example, assumed that the area 1401 shown in FIG. 14 is designated as a coefficient range to be transmitted in the MSG bit plane shown in FIG. 7. In this case, as shown in FIG. 15, zigzag scan is applied to the MSB bit plane, and (0, 1) is detected as a symbol (RUN, EOP).

If in the MSB bit plane, the area 1601 shown in FIG. 16 is designated as a coefficient range, (2, 0) and (2, 1) are detected. The run-length code generated from the area 1401 shown in FIG. 14 and run-length code generated from the area 1601 shown in FIG. 16 can also be handled as data for different hierarchical levels.

Other bit planes, such as MSB-1 and the like are similarly processed. Furthermore, other blocks in the frame are similarly processed.

Figure 17:
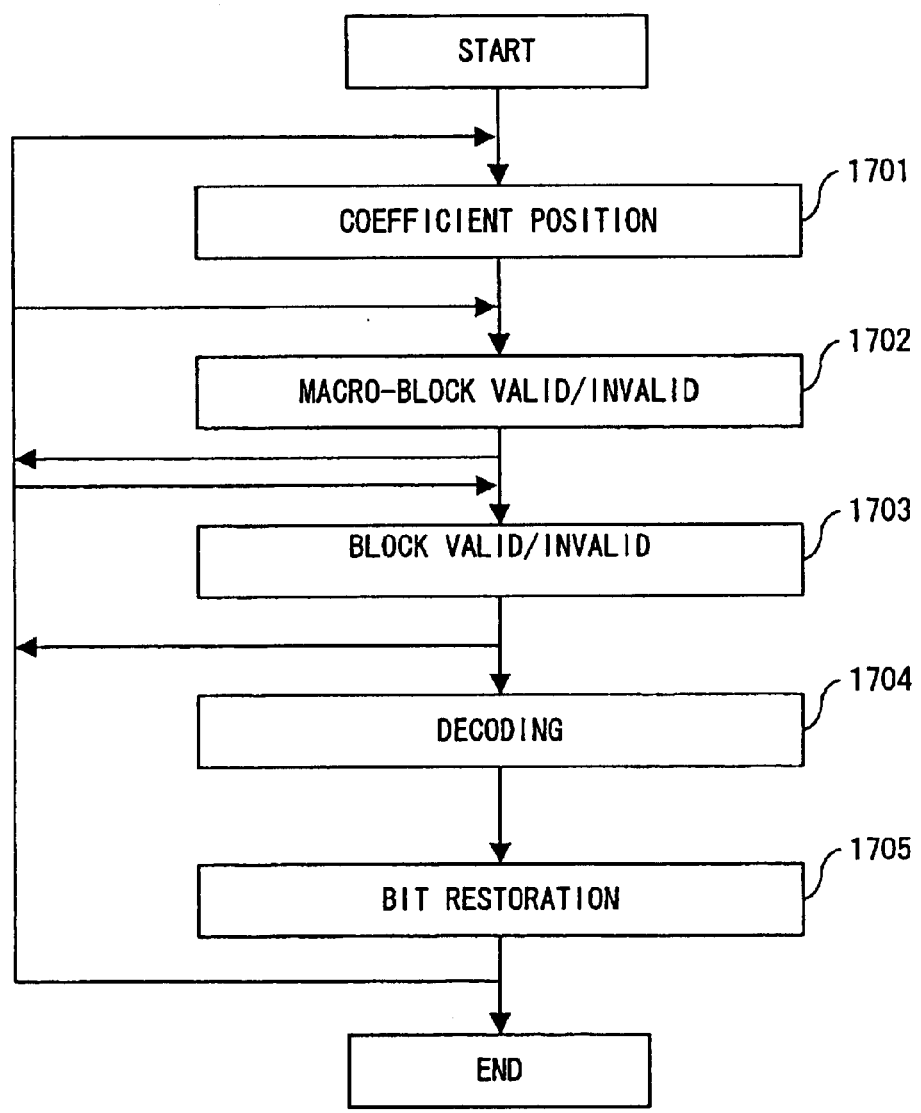
FIG. 17 is a flowchart showing the first decoding process.

FIG. 17 is a flowchart showing the decoding process of the decoding device receiving a bit stream. The decoding device reads coefficient position information following a hierarchical-level synchronous bit (1701), also reads a micro-block validity/invalidity bit (1702) and further reads a block validity/invalidity bit (1703). Then, the decoding device decodes the code to generate a run-length code (1704), and restores the bit plane using both the run-length code and coefficient position information (1705).

If the coefficient position information shown in FIG. 11 is read, the bit plane can be restored by applying a run-length code to an area between the coefficient positions a and b.

The processes in 1703 through 1705, those in 1702 through 1705 and those in 1701 through 1705 are repeated for each block, macro-block and hierarchical level, respectively. If in 1702, the macro-block is invalid, the processes in 1703 through 1705 are skipped. If in 1703, the block is invalid, the processes in 1704 and 1705 are skipped.

In the conventional encoding process shown in FIG. 3, although a bit z indicating the amount of shift of a bit plane is transmitted for each block, the amount of shift can also be fixedly transmitted for each hierarchical level, instead of for each block.

In this case, in 1003 shown in FIG. 10, the encoding device transmits a bit (1–5 bits) indicating the amount of shift in the hierarchical level as part of the header information of the frame. Then, in 1004, the bit plane is shifted using the amount of shit of the hierarchical level. According to such a transmission method, transmission data about the amount of shift can be reduced.

Although in 1205 of FIG. 12, a block validity/invalidity bit is added to the block header, this information can also be added to a frame header. In this case, in 1205, the encoding device separately applies run-length encoding only to the block validity/invalidity bit, and transmits it as part of the header information of the frame. According to such a transmission method, transmission data about block validity/invalidity can be reduced.

Figure 18:
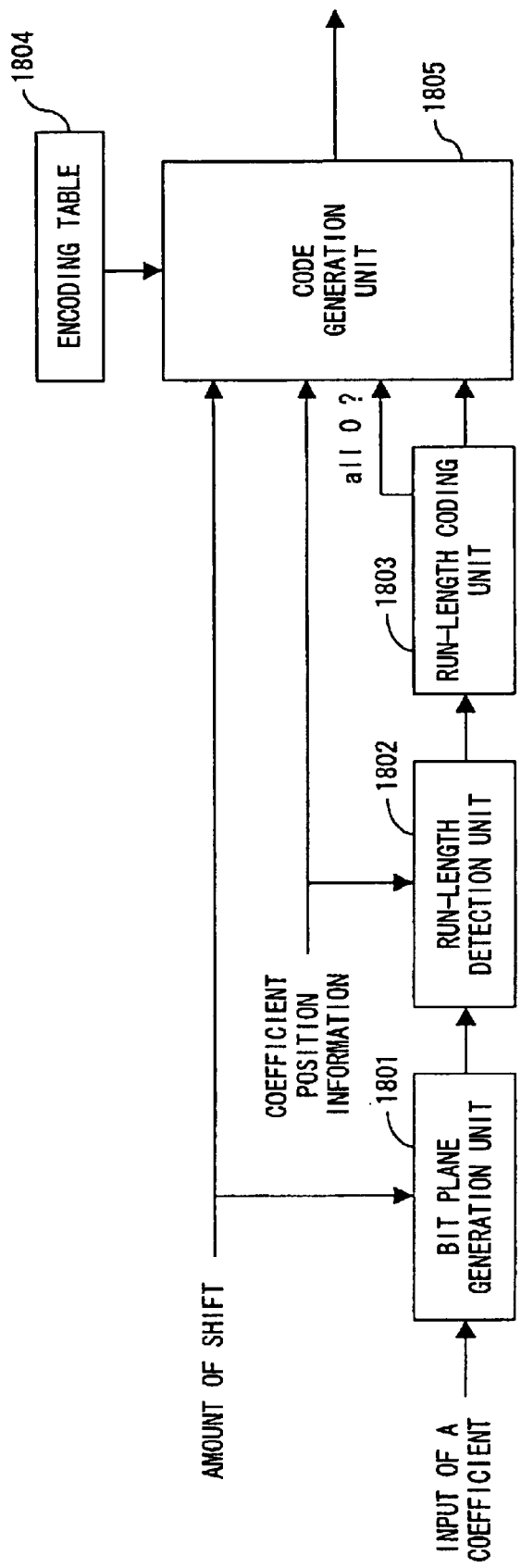
FIG. 18 shows the configuration of the first encoding device.

FIG. 18 shows the circuit configuration of the encoding device performing the first encoding process. The encoding device shown in FIG. 18 comprises a bit plane generation unit 1801, a run-length detection unit 1802, a run-length encoding unit 1803, an encoding table 1804 and a code generation unit 1805.

The bit plane generation unit 1801 expands an inputted coefficient into bit planes and shifts each bit plane, based on the predetermined amount of shift. The run-length detection unit 1802 detects its run length from a bit plane using inputted coefficient position information. The run-length encoding unit 1803 generates a run-length code (RUN, EOP), using the detected run length.

The run-length encoding unit 1803 also outputs both macro-block and block validity/invalidity bits (all 0?). Then, the code generation unit 1805 applies variable-length encoding to a run-length code referring to the encoding table 1804, and outputs the code. The code generation unit 1805 outputs the amount of shift, coefficient position information and validity/invalidity bit.

Figure 19:
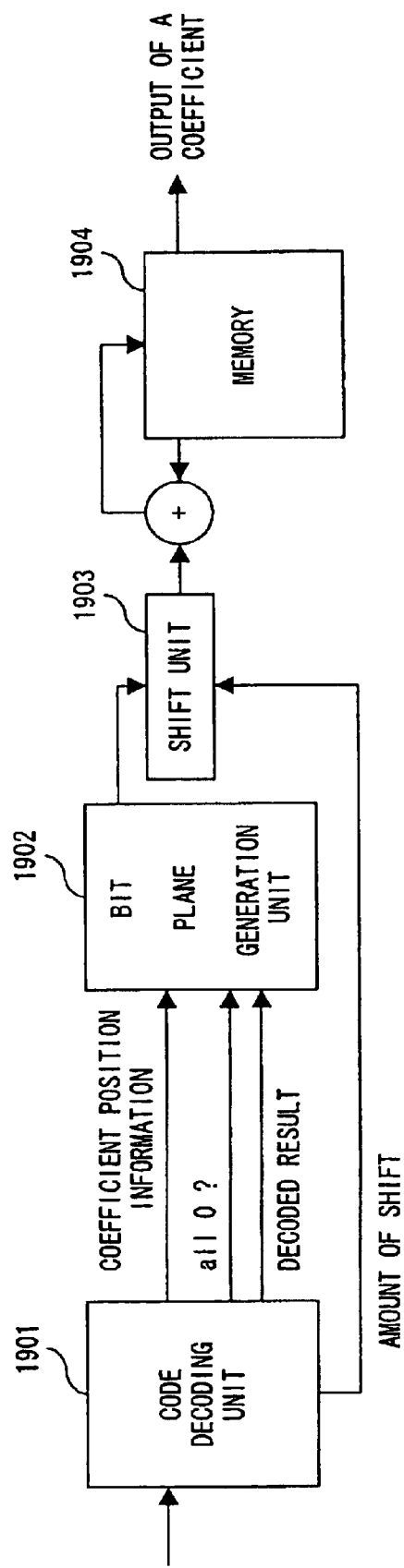
FIG. 19 shows the configuration of the first decoding device.

FIG. 19 shows the circuit configuration of the decoding device performing the first decoding process. The decoding device shown in FIG. 19 comprises a code decoding unit 1901, a bit plane generation unit 1902, a shift unit 1903 and memory 1904.

The code decoding unit 1901 decodes a code in the inputted bit stream to output a decoding result, and also outputs the amount of shift, coefficient position information and a validity/invalidity bit. The bit plane generation unit 1902 generates the bit plane of a block using the coefficient position information, validity/invalidity bit and decoding result. The shift unit 1903 shifts each bit plane, based on its amount of shift. The memory 1904 stores the addition result of the bit plane of each inputted hierarchical level and restores/outputs the coefficient block.

Next, the second encoding/decoding method is described in detail with reference to FIGS. 20 through 26. In the second encoding, the number of an available coefficient position is limited to one, and inter-block run-length encoding is performed instead of intra-block run-length encoding.

Figure 20:
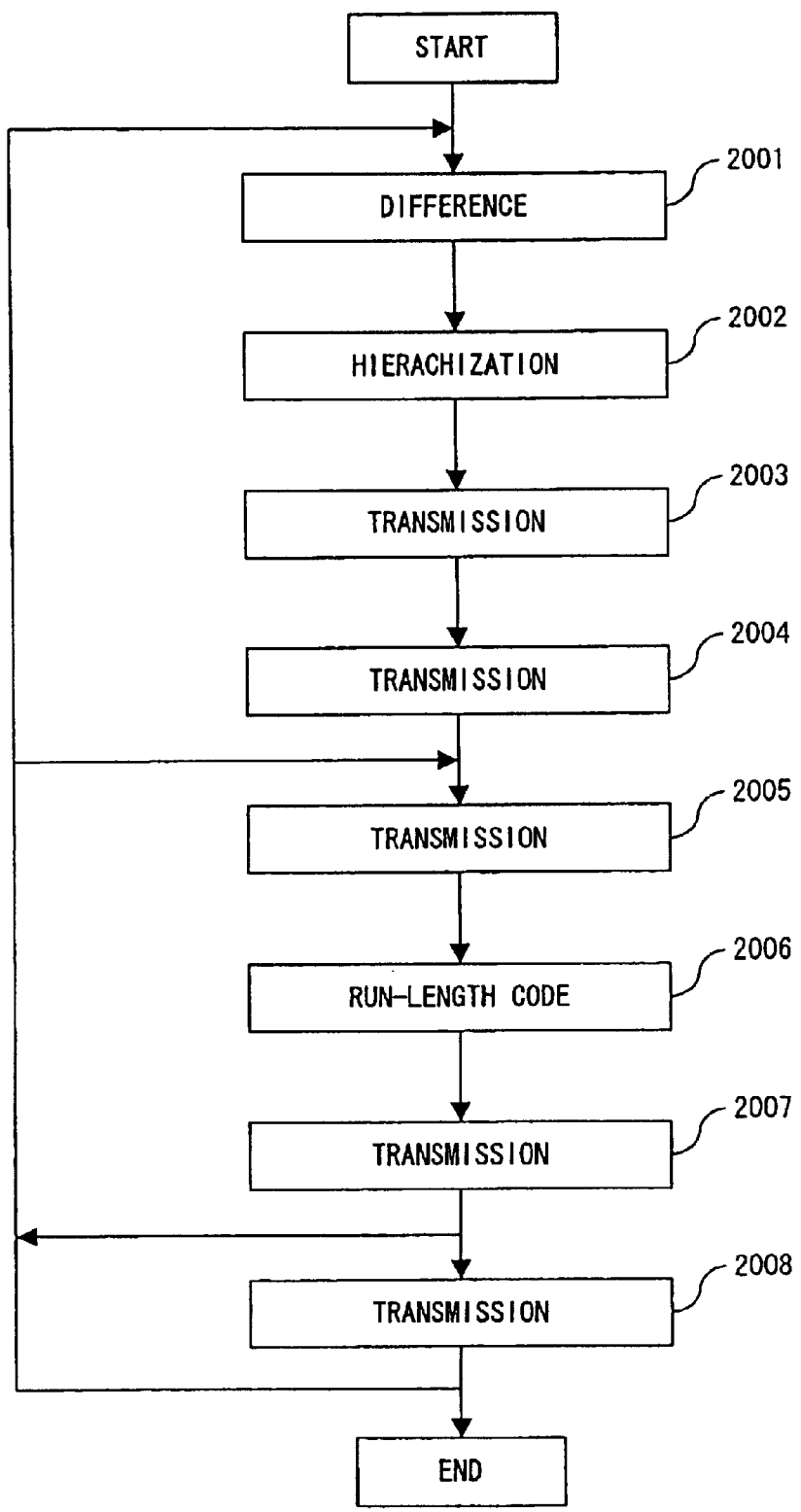
FIG. 20 is a flowchart showing the second decoding process.

FIG. 20 is a flowchart showing the second encoding process. In FIG. 20, processes in 2001 and 2002 are the same as those in 301 and 302 shown in FIG. 3. In 2003, the encoding device transmits both a frame synchronous bit and a bit indicating the possibility of shift. If the shift is possible, the coefficient is shifted. Then, coefficient shift information for one frame is transmitted as part of the header information of the frame (2004). This coefficient shift information indicates the amount of shit to be used in each hierarchical level.

Then, both a hierarchical-level synchronous bit and a hierarchical-level identifier are transmitted, and information indicating its coefficient position y in the hierarchical level is also transmitted (2005). This coefficient position information designates one coefficient position (one bit) in one block.

Then, the bit value (1 or 0) of a position designated by the coefficient position information is detected using the shifted bit plane, and run-length encoding is applied to one entire frame (all blocks) (2006). In this case, different from the first encoding, only one bit of coefficient information is extracted from each block, and regular run-length encoding is applied using only RUN.

Then, information indicating hierarchical-level validity/invalidity is transmitted (2007). If all the block bits obtained in 2006 are 0, the hierarchical level is invalid. Then, variable-length encoding is applied to the run-length code obtained in 2006, and the code bit is transmitted (2008).

The processes in 2005 through 2008 are sequentially repeated from the MSB side for each hierarchical level, and those in 2001 through 2008 are repeated for each frame. If in 2007, the hierarchical level is invalid, the process in 2008 is skipped, and no code is transmitted.

Figure 21:
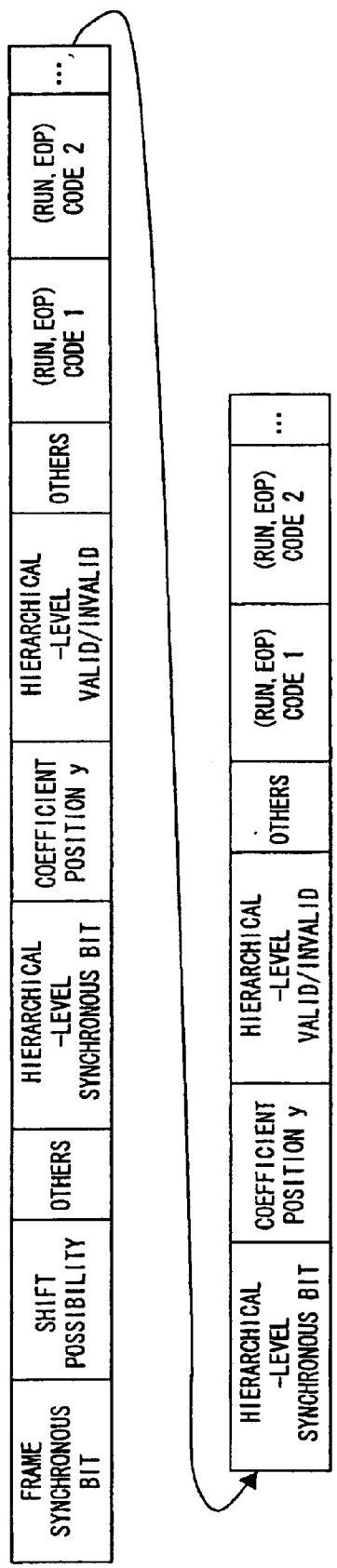
FIG. 21 shows a bit stream in the second encoding.

Thus, for example, a bit stream as shown in FIG. 21 is generated, and is transmitted to the receiving device. According to such an encoding process, only one coefficient position is designated for each block, and run-length encoding is applied to the entire frame. Therefore, encoding efficiency can be greatly improved, compared with the first encoding.

Figure 22:
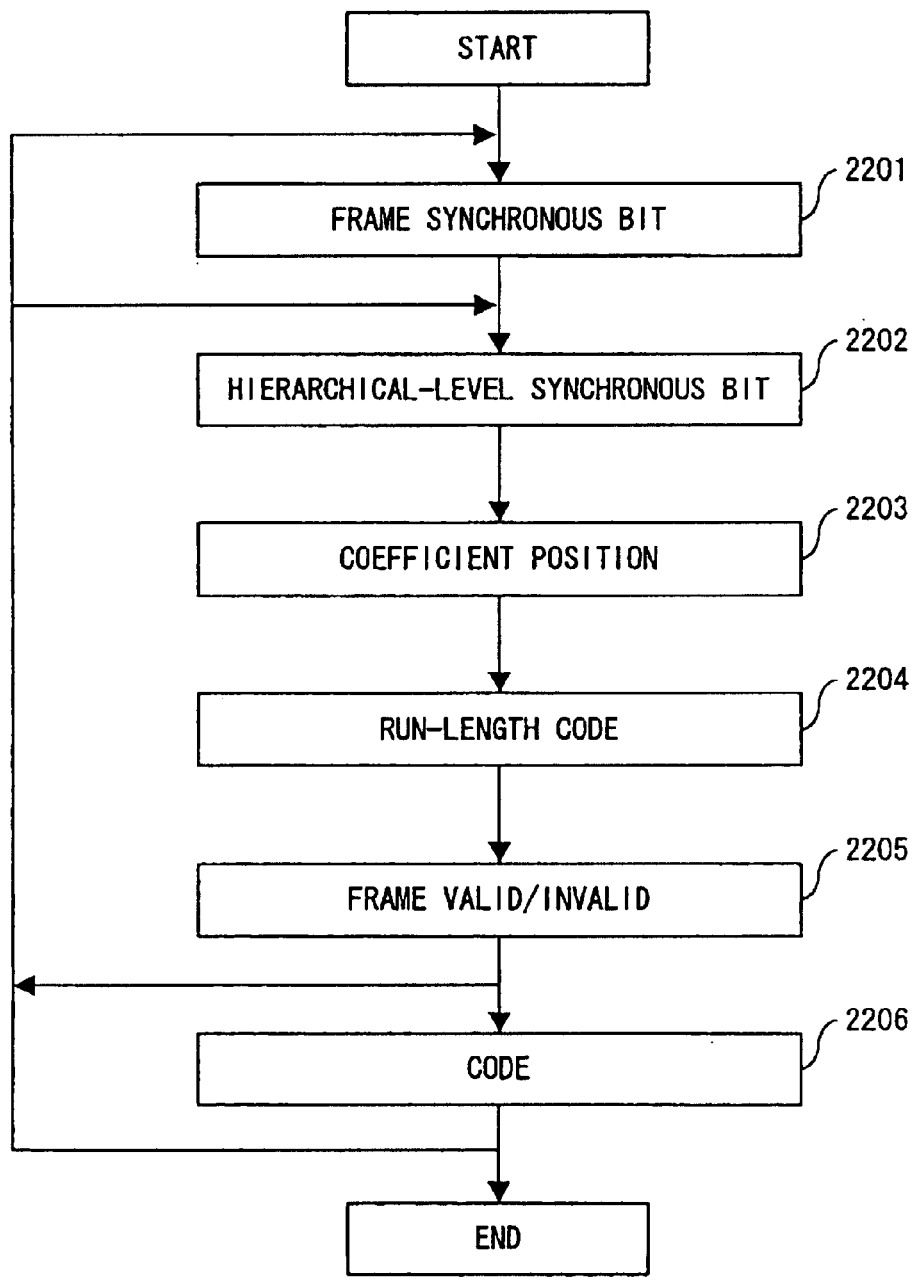
FIG. 22 is a flowchart showing details of the second encoding process.

FIG. 22 is a flowchart showing the detailed processes in 2003 through 2008 of FIG. 20. The encoding device firstly transmits a frame synchronous bit and then transmits both a bit indicating shift possibility and coefficient shift information (2201). For the frame synchronous bit, 0×01B9 (32 bits) or the like is used.

Then, a hierarchical-level synchronous bit (including a hierarchical-level number) is transmitted (2202), and then the coefficient position information of the hierarchical level is transmitted (2203). In this case, one of order numbers shown in FIG. 13 is used as coefficient position information.

Then, the bit value of a position designated by the coefficient position information is detected from the bit plane of each block in the hierarchical level, and run-length encoding is applied to the entire frame (2204). In this case, run-length encoding is applied from the left to the right and from the top to the bottom on the screen.

Then, the validity/invalidity of the hierarchical level is determined using the result of 2204, and a bit indicating hierarchical-level validity/invalidity is transmitted (2205). If all bit values on the screen are zero, the hierarchical level is invalid. If the hierarchical level is valid, variable-length encoding is applied to the run-length code obtained in 2204, and the code bit is transmitted (2206).

The processes in 2202 through 2206 are repeated for each hierarchical level. If in 2205, the hierarchical level is invalid, the process in 2206 is skipped.

Although in this example, one coefficient position is designated for one bit plane, two or more coefficient positions can also be designated. In this case, codes generated from the different coefficient positions for the same bit plane are transmitted as different hierarchical level picture information.

Figure 23:
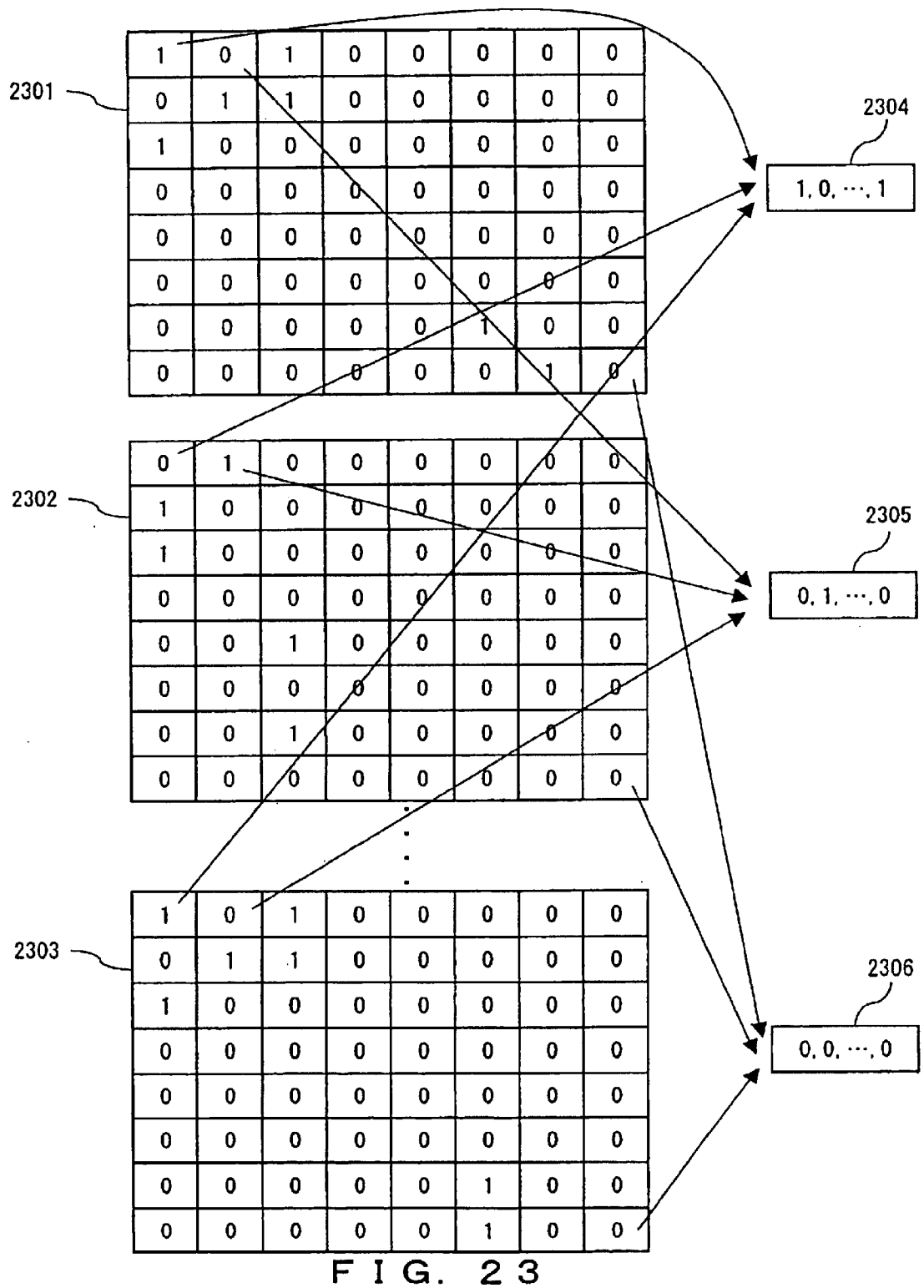
FIG. 23 shows the run-length encoding of one frame.

FIG. 23 shows an example of the encoding of an MSB bit plane. This bit plane is composed of (N+1) blocks. Blocks 2301, 2302 and 2303 correspond to block 0, block 1 and block N, respectively.

Firstly, by collecting only the MSB of the 0-th coefficient in each block by designating the 0-th coefficient position, a bit string 2304 is obtained. By applying run-length encoding to this bit string using only RUN, a code, 0, . . . and the like, can be obtained.

By collecting only the MSG of the first coefficient of each block by designating the first coefficient position, a bit string 2305 is obtained. By applying run-length encoding to this bit string, a code, 1, . . . and the like, can be obtained.

Furthermore, by collecting only MSB of the $63^{rd}$ coefficient of each block by designating the $63^{rd}$ coefficient position, a bit string 2306 is obtained. Similarly, run-length encoding can be applied to this bit string. Run-length codes generated from the bit strings 2304, 2305 and 2306 can also be handled as different hierarchical level data.

Figure 24:
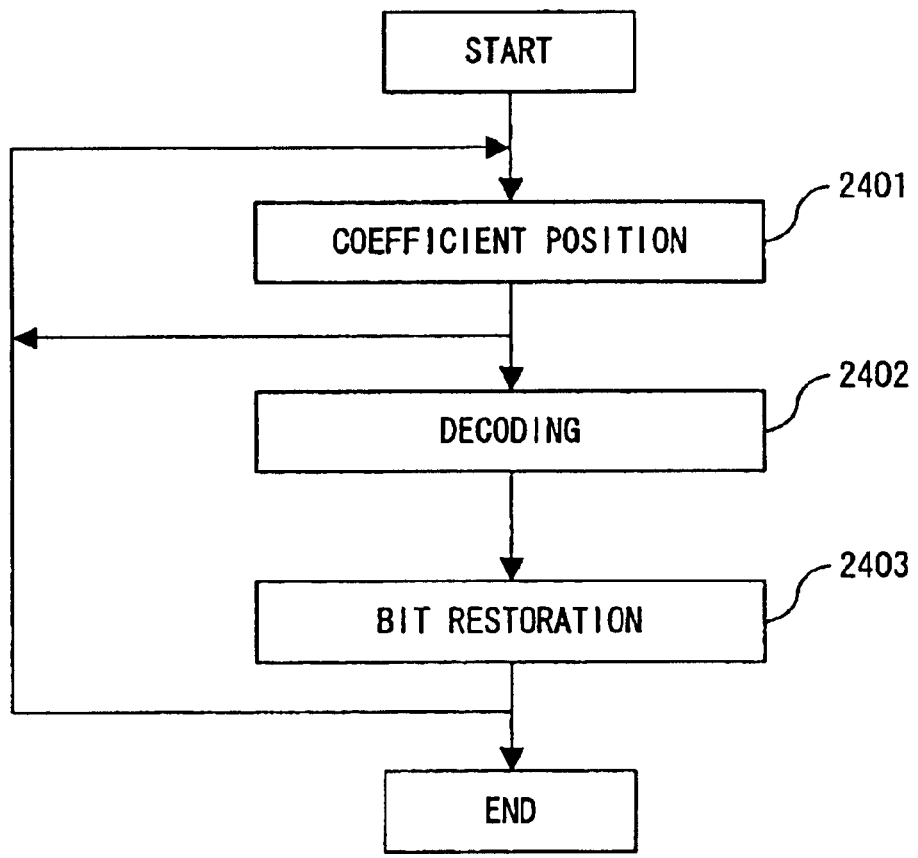
FIG. 24 is a flowchart showing the second decoding process.

FIG. 24 is a flowchart showing the decoding process of the decoding device receiving a bit stream. The decoding device reads coefficient position information following a hierarchical-level synchronous bit, and then reads the hierarchical-level validity/invalidity bit (2401). Then, run-length decoding is applied to the code (2402), and the bit plane is restored using both the decoding result and coefficient position information (2403). In this case, bits in positions other than one designated by the coefficient position information are set to 0.

The processes in 2401 through 2403 are repeated for each hierarchical level. If in 2401, the hierarchical level is invalid, the processes in 2402 and 2403 are skipped.

Although in 2205 of FIG. 22, a hierarchical-level validity/invalidity bit is transmitted, there is no need to transmit it if the hierarchical level is invalid. Therefore, full information about the hierarchical level can be discarded, and a subsequent hierarchical level can also be encoded. In this case, if in 2205, the hierarchical level is invalid, the encoding device discards the full information about the hierarchical level, and performs processes in 2202 and after. Thus, the transmission of a hierarchical level validity/invalidity bit can be omitted.

Although in 2006 of FIG. 20, run-length encoding is applied using only RUN, as in the first encoding, run-length encoding can also be applied using a symbol (RUN, EOP)

Figure 25:
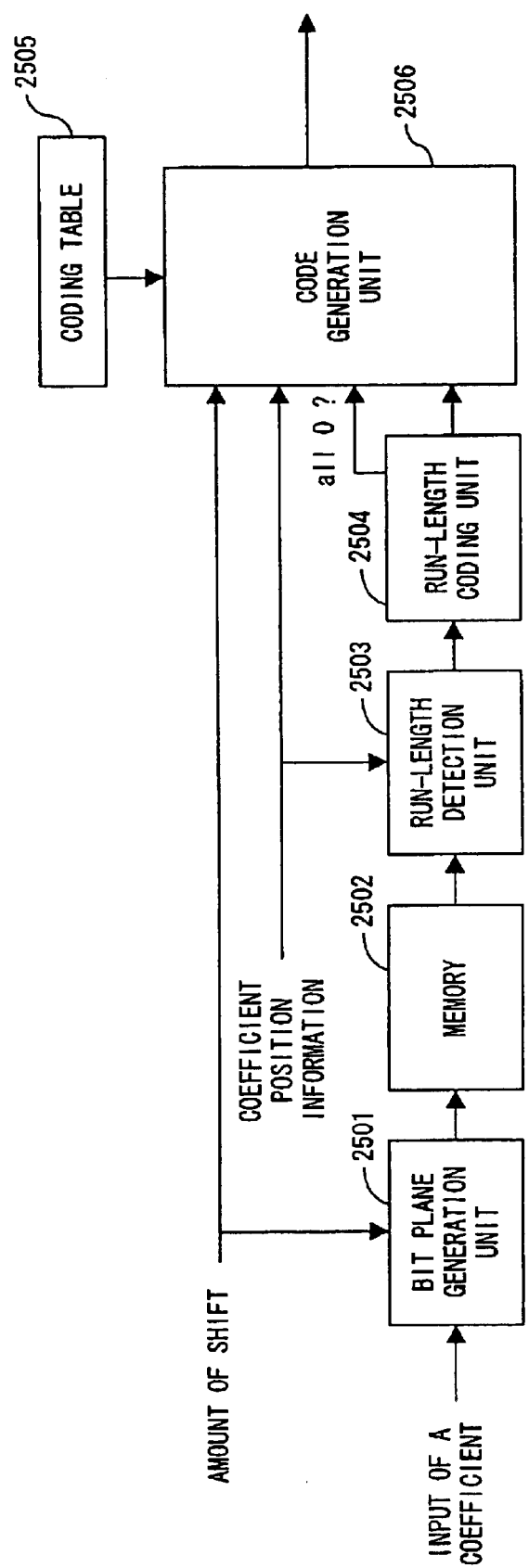
FIG. 25 shows the configuration of the second encoding device.

FIG. 25 shows the circuit configuration of the encoding device performing the second encoding process. The encoding device shown in FIG. 25 comprises a bit plane generation unit 2501, memory 2502, a run-length detection unit 2503, a run-length encoding unit 2504, an encoding table 2505 and a code generation unit 2506.

The bit plane generation unit 2501 expands an inputted coefficient to bit planes, shifts each bit plane, based on the predetermined amount of shift and outputs bit planes for one frame to the memory 2502. The run-length detection unit 2503 detects run length from the bit plane of the memory 2502 using the inputted coefficient position information. The run-length encoding unit 2504 generates a run-length code using the detected run length.

The run-length encoding unit 2504 also outputs a hierarchical-level validity/invalidity bit (all 0?). The code generation unit 2506 applies variable-length encoding to the run-length code, referring to the encoding table 2505, and outputs the code. The code generation unit 2506 also outputs the amount of shift, coefficient position information and validity/invalidity bit.

Figure 26:
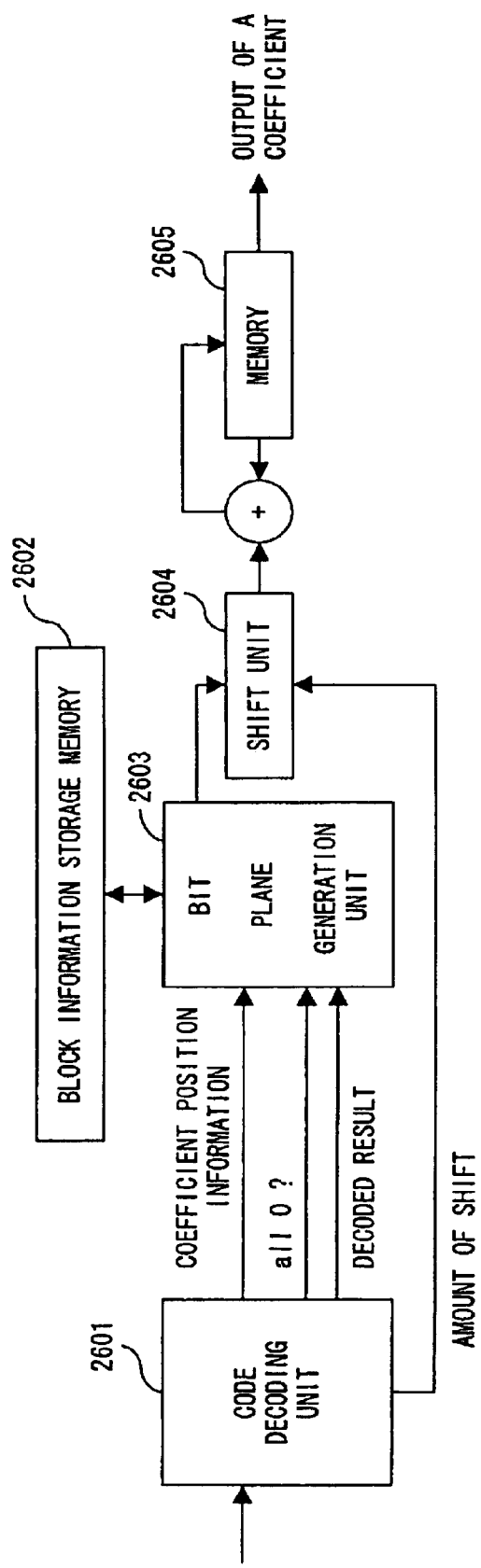
FIG. 26 shows the configuration of the second decoding device.

FIG. 26 shows the circuit configuration of the decoding device performing the second decoding. The decoding device shown in FIG. 26 comprises a code decoding unit 2601, block information storage memory 2602, a bit plane generation unit 2603, a shift unit 2604 and memory 2605.

The code decoding unit 2601 decodes the code in an inputted bit stream to output the decoding result, and also outputs the amount of shift, coefficient information and validity/invalidity bit.

The bit plane generation unit 2603 generates a bit plane for each block, using the coefficient position information, validity/invalidity bit and the decoding result. In this case, the bit planes for one frame are stored in advance in the block information storage memory 2602. The shift unit 2604 shifts each bit plane, based on the amount of shift. The memory 2605 stores the addition result of the inputted bit planes of each hierarchical level, and restores/outputs the coefficient block.

Next, the third encoding/decoding method is described in detail with reference to FIGS. 27 through 33. In the third encoding, a hierarchical level is defined by using a coefficient value itself, instead of a bit plane, and designating the coefficient position of a block.

Generally, in a block, a coefficient on the low frequency side (lower-order coefficient) has priority over a coefficient on the high frequency side (higher-order coefficient). Therefore, coefficient positions are sequentially designated from a lower-order coefficient to a higher-order coefficient, and by transmitting the coefficient of each hierarchical level in this order, efficient distribution can be realized.

FIG. 27 is a flowchart showing the third encoding process. The processes in 2701 and 2702 shown in FIG. 27 are the same as those in 301 and 302, respectively, shown in FIG. 3. However, in the third encoding, coefficients obtained by DCT are not handled as bit planes.

In 2703, the encoding device transmits a frame synchronous bit. Then, the encoding device transmits both a hierarchical-level synchronous bit and a hierarchical-level identifier, and then transmits both the quantization size of the hierarchical level and information for designating a coefficient position y in the hierarchical level (2704). This coefficient position information, for example, designates one coefficient position in one block. Alternatively, the same coefficient position can be designated in a plurality of different hierarchical levels.

Then, a coefficient in a position designated by the coefficient position information is extracted from each block of the hierarchical level and is quantized (2705), and a bit indicating hierarchical level validity/invalidity is transmitted (2706). If the quantized coefficient values of all blocks obtained in 2705 are 0, the hierarchical level is invalid. Then, variable-length encoding is applied to the quantized coefficient values, and the code bits are transmitted (2707).

The processes in 2704 through 2707 and those in 2701 through 2707 are repeated for each hierarchical level and frame, respectively. If in 2706, the hierarchical level is invalid, the process in 2707 is skipped, and no code is transmitted. Thus, if all the quantized coefficients are 0, encoding efficiency is improved.

Figure 28:
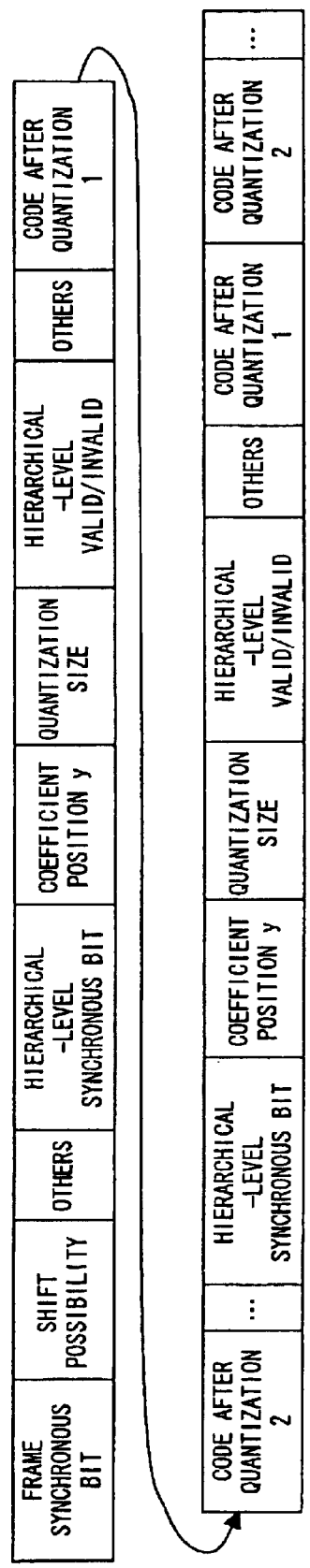
FIG. 28 shows a bit stream in the third encoding.

Thus, for example, a bit stream as shown in FIG. 28 is generated, and is transmitted to the receiving device. In such an encoding process, a bit plane obtained by the conventional hierarchical encoding is not used, and instead, hierarchization is performed by designating a coefficient position. Therefore, encoding can be without depending on the number of bit planes.

Figure 29:
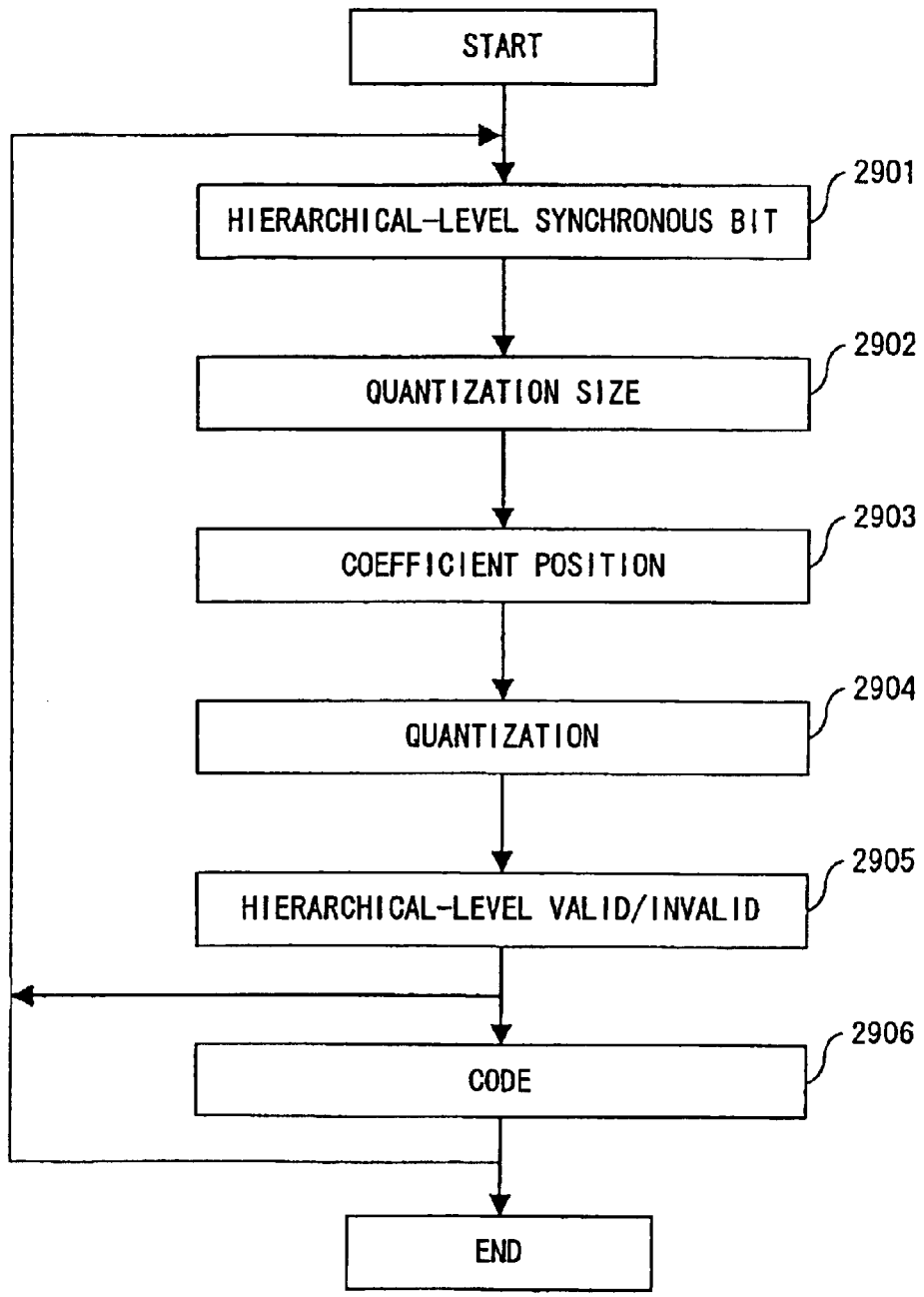
FIG. 29 is a flowchart showing details of the third encoding process.

FIG. 29 is a flowchart showing the detailed process of 2704 through 2707 shown in FIG. 27. The encoding device firstly transmits a hierarchical-level synchronous bit (including a hierarchical-level number) (2901), and then transmits a bit (5 bits) indicating the quantization size of the hierarchical level is transmitted (2902).

If a coefficient in the same position is quantized with different quantization sizes in different hierarchical levels, a coefficient with coarser quantization size is first transmitted as a hierarchical level with higher priority, and a coefficient with finer quantization size is transmitted later as a hierarchical level with lower priority. In this case, encoding efficiency can be improved by encoding only the quantization error of the hierarchical level with higher priority in the hierarchical level with lower priority.

For example, if a coefficient in the same position with large quantization size in the previous hierarchical level B, in 2904 the dequantization result of the quantized coefficient is subtracted from the coefficient before quantization of hierarchical level B, and the obtained difference (quantization error) is quantized.

Then, the validity/invalidity of the hierarchical level is determined based on the result of 2904, and a bit indicating hierarchical-level validity/invalidity is transmitted (2905). If the quantized coefficient are all zero, the hierarchical level is invalid. Then, variable-length encoding is applied to the quantized coefficient, and the code bit is transmitted (2906).

The processes in 2901 through 2906 are repeated for each hierarchical level. If in 2905, the hierarchical level is invalid, the process in 2906 is skipped. According to such a process, quantized coefficients are directly collected and encoded. If there is a plurality of hierarchical levels in which the same coefficient position is designated, only quantization errors are encoded in a hierarchical level with lower priority. Therefore, encoding efficiency can be improved.

FIG. 30 shows an example of encoding in a specific hierarchical level. One frame is composed of (N+1) blocks, and blocks 3001, 3002 and 3003 correspond to blocks 0, 1 and N, respectively.

In this example, quantization is performed by simple division by quantization size (dropping the fractional portion) for convenience sake. If the 0-th coefficient position is designated and quantization size is 2, the coefficient values before and after quantization of each block become as follows.

|          | Before quantization | After quantization |
|----------|---------------------|--------------------|
| Block 0: | 10                  | 5                  |
| Block 1: | 3                   | 1                  |
| ...      |                     |                    |
| Block N: | 15                  | 7                  |

Therefore, the encoding result of this hierarchical level becomes (code of 5) (code of 1) . . . (code of 7). Other hierarchical levels are similarly encoded. Although in this example, one coefficient position is designated in one hierarchical level, as in the first encoding, the range of coefficient positions can also be designated instead.

Figure 31:
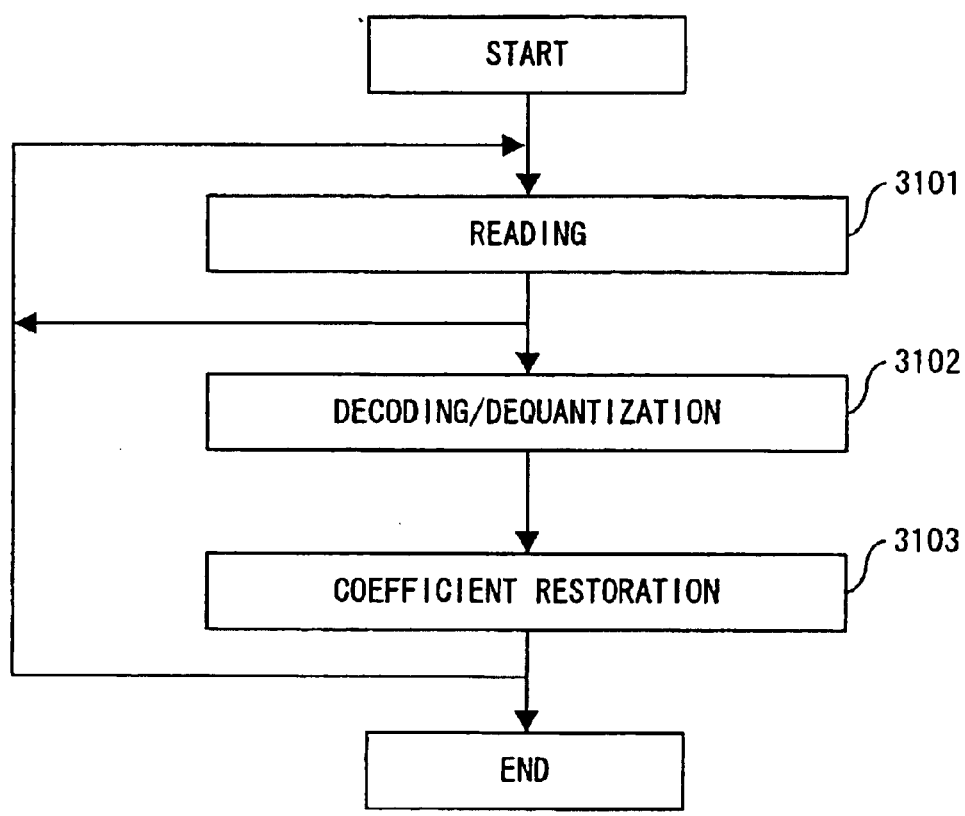
FIG. 31 is a flowchart showing the third decoding process.

FIG. 31 is a flowchart showing the decoding process of the decoding device receiving a bit stream. The decoding device reads coefficient position information following a hierarchical-level synchronous bit, and then reads a hierarchical level validity/invalidity bit (3101). Then, the decoding device decodes a code and dequantizes the result of decoding (3102), and restores the coefficient using both the result of the dequantization and coefficient position information (3103). In this case, coefficients in positions other than one designated by the coefficient position information are set to 0.

The processes in 3101 through 3103 are repeated for each hierarchical level. If in 3101, the hierarchical level is invalid, the processes in 3102 and 3103 are skipped.

In 2905 of FIG. 29, although a hierarchical level validity/invalidity bit is transmitted, there is no need to transmit it if the hierarchical level is invalid. Therefore, full information about the hierarchical level can also be discarded, and a subsequent hierarchical level can also be encoded. In this case, if in 2905, the hierarchical level is invalid, the encoding device can discard full information about the hierarchical level and performs the processes in 2901 and after. Thus, the transmission of a hierarchical level validity/invalidity bit can be omitted.

Although in 2906 of FIG. 29, each coefficient is encoded, if the quantized coefficient contains 0, run length can also be detected from one entire frame, and run-length encoding can also be applied. In this case, variable-length encoding is applied to the combination of the run length and a non-zero coefficient value, and a code is generated.

Figure 32:
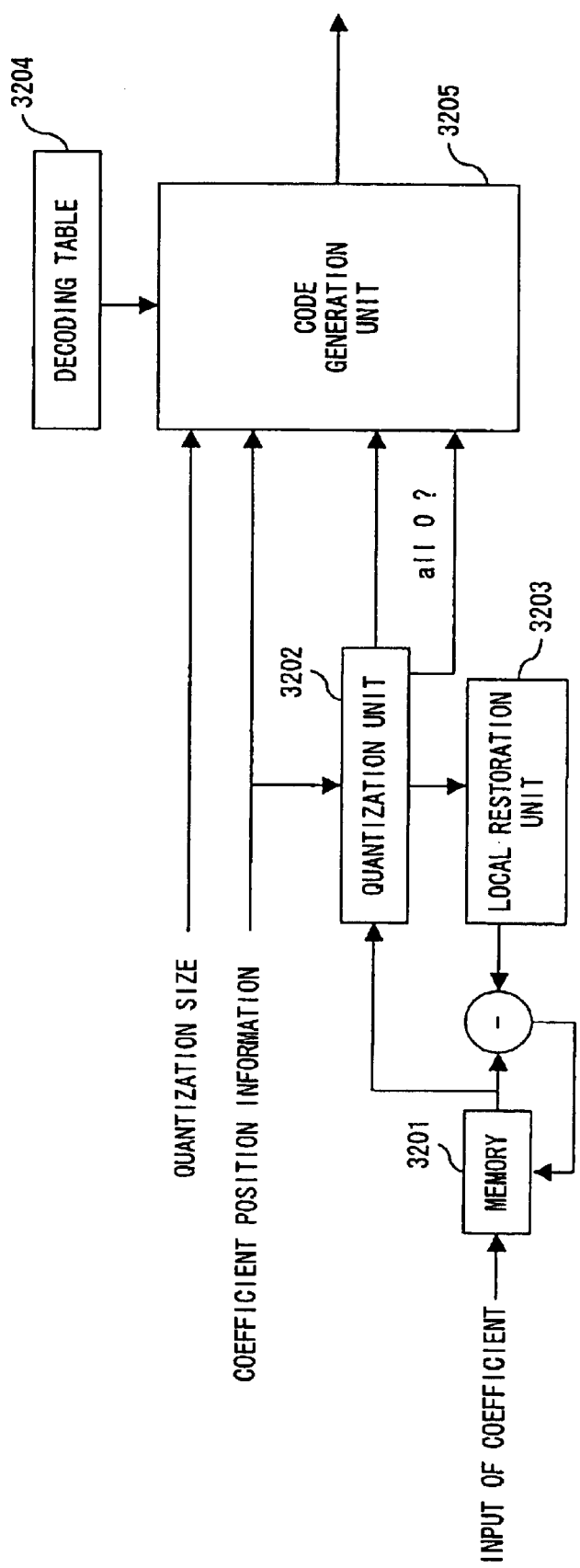
FIG. 32 shows the configuration of the third encoding device.

FIG. 32 shows the circuit configuration of the encoding device performing the third encoding process. The encoding device shown in FIG. 32 comprises memory 3201, a quantization unit 3202, a local decoding unit 3203, an encoding table 3204 and a code generation unit 3205.

The memory 3201 stores inputted coefficients, and the quantization unit 3202 quantizes a coefficient using both inputted quantization size and coefficient position information. The local decoding unit 3203 dequantizes the quantized coefficient. Thus, the result of the dequantization is subtracted from the coefficient stored in the memory 3201 and the obtained difference is stored in the memory 3201. The quantization unit 3202 also outputs a hierarchical level validity/invalidity bit (all 0?).

Then, the code generation unit 3205 applies variable-length encoding to the quantized coefficient referring to the encoding table 3204, and outputs a code. The code generation unit 3205 also outputs quantization size, coefficient position information and a validity/invalidity bit.

Figure 33:
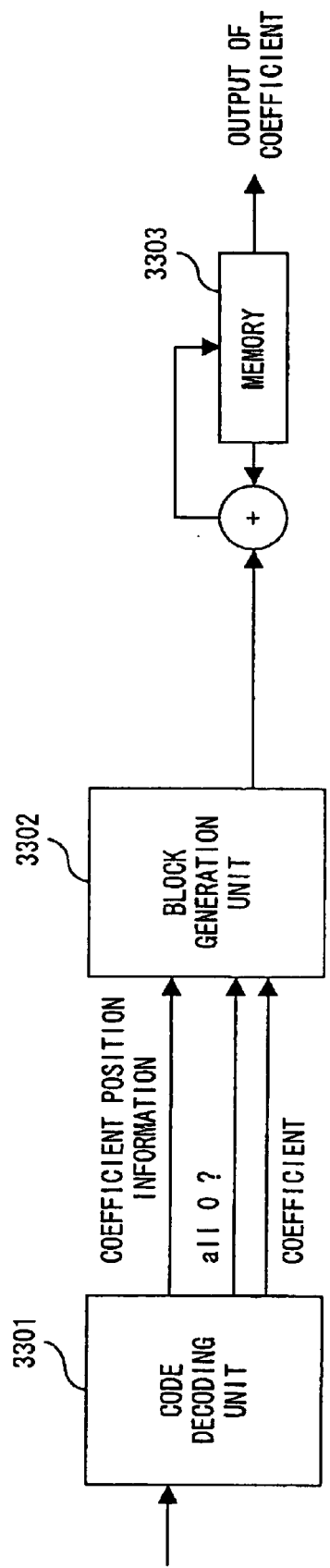
FIG. 33 shows the configuration of the third decoding device.

FIG. 33 shows the circuit configuration of the decoding device performing the third decoding process. The decoding device shown in FIG. 33 comprises a code decoding unit 3301, a block generation unit 3302 and memory 3303.

The code decoding unit 3301 decodes a code in an inputted bit stream, dequantizes the result of decoding, outputs the coefficient of each hierarchical level, and also transmits both coefficient position information and a validity/invalidity bit.

The block generation unit 3302 generates the data of each block in each hierarchical level using the coefficient position information, validity/invalidity bit and coefficient. The memory 3303 stores the addition result of the inputted data of each hierarchical level, and restores/outputs the coefficient block.

The first, second or third encoding/decoding devices can also be realized using an information processing device (computer) as shown in FIG. 34. The information processing device shown in FIG. 34 comprises a CPU (central processing unit) 3401, memory 3402, an input device 3403, an output device 3404, an external storage device 3405, a medium driving device 3406 and a network connection device 3407, which are all connected to each other through a bus 3408.

For the memory 3402, a ROM (read-only memory), a RAM (random-access memory) or the like is used, the memory 3402 stores programs and data that are used for the process. The CPU 3401 executes encoding and decoding programs using the memory 3402 to perform the encoding/decoding processes.

For the input device 3403, a keyboard, a pointing device, a touch panel or the like is used, and the input device 3403 is used for a user to input instructions and information. For the output device 3404, a display, a printer, a speaker or the like is used, and the output device is used to output inquiries and information to a user.

For the external storage device 3405, a magnetic disk device, an optical disk device, a magneto-optical disk device, a tape device or the like is used. The information processing device stores the programs and data, and uses them by loading them onto the memory 3402, as requested.

The medium driving device 3406 drives a portable storage medium 3409 and accesses its recorded contents. For the portable storage medium 3409, an arbitrary computer-readable storage medium, such as a memory card, a flexible disk, a CD-ROM (compact disk read-only memory), an optical disk, a magneto-optical disk and the like, is used. A user stores in advance the programs and data in this portable storage medium, and uses them by loading them onto the memory 3402, as requested.

The network connection device 3407 is connected to a communication network for streaming distribution, and transmits/receives bit streams. The information processing device receives the programs and data from an external device through the network connection device 3407, and uses them by loading them on to the memory 3402, as requested.

FIG. 35 shows examples of the computer-readable storage media that can supply the programs and data to the information processing device shown in FIG. 34. The programs and data stored in the portable medium 3409 or the database 3502 of a server 3501 can be loaded on to the memory 3402. In this case, the server 3501 generates a propagation signal for propagating the programs and data, and transmits the propagation signal to the information processing device through an arbitrary medium on the network. Then, the CPU 3401 executes the programs using the data to perform necessary processes.

Although in the preferred embodiments described above, the distribution of moving pictures is mainly described, the present invention is not limited to the distribution of moving pictures, and can be applied to the distribution of arbitrary information including voices and the like.

According to the present invention, the types of variable-length codes to be prepared can be reduced by restricting the range of coefficients to be encoded in an enhancement layer in the distribution of hierarchical code data composed of a base layer and an enhancement layer. Therefore, the number of bits of the entire variable-length code can be reduced, and accordingly, the encoding efficiency of the enhancement layer can be improved.

What is claimed is:

1. A hierarchical encoding device which encodes and transmits data in a first layer, in a second layer, calculates difference data between decoded data of the first layer and predetermined data, divides the difference data into a plurality of blocks, calculates a coefficient of each block by applying orthogonal transformation and encodes and transmits the coefficient, comprising:

a bit plane generation unit hierarchizing the second layer by expanding the coefficient to a plurality of bit planes;

an encoding unit encoding a bit value in a coefficient position in a range designated by coefficient position information of a hierarchical level in the second layer, in a bit plane of the hierarchical level, and generates a code; and a transmitting unit transmitting the coefficient position information and code.

2. A hierarchical encoding device which encodes and transmits data in a first layer, in a second layer, calculates difference data between decoded data of the first layer and predetermined data, divides the difference data into a plurality of blocks, calculates a coefficient of each block by applying orthogonal transformation, and encodes and transmits the coefficient, comprising:

a bit plane generation unit hierarchizing the second layer by expanding the coefficient to a plurality of bit planes;

an encoding unit detecting a bit value in a coefficient position designated by coefficient position information of a hierarchical level in the second layer, in a bit plane of each block of the hierarchical level, and generates a code by applying run-length encoding to bit values detected from a plurality of blocks, and a transmitting unit transmitting the coefficient position information and code.

3. A hierarchical encoding device which encodes and transmits data in a first layer, in a second layer, calculates difference data between decoded data of the first layer and predetermined data, divides the difference data into a plurality of blocks, calculates a coefficient of each block by applying orthogonal transformation, and encodes and transmits the coefficient, comprising:

a quantization unit extracting from each block of one hierarchical level in the second layer hierarchized by designating a coefficient position of each block, a value in a coefficient position designated by coefficient position information of the hierarchical level and quantizing the value;

an encoding unit generating a code by encoding the quantized value; and a transmitting unit transmitting the coefficient position information and code.

4. The hierarchical encoding device according to claim 3, wherein said encoding unit generates the code by applying run-length encoding to the quantized values of a plurality of blocks.

5. The hierarchical encoding device according to claim 3, wherein when the same coefficient position is designated in a plurality of hierarchical levels in the second layer, said quantization unit quantizes the extracted value with a large quantization size in a hierarchical level with higher priority, and quantizes the value with a small quantization size in a hierarchical level with lower priority.

6. A decoding device which receives and decodes data in a first layer, in a second layer, receives and decodes data, applies inversion of orthogonal transformation to an obtained coefficient and adds an inversion result to a decoding result in the first layer, comprising:

a receiving unit receiving both coefficient position information and a code of one hierarchical level in the second layer hierarchized by expanding the coefficient to a plurality of bit planes;

a decoding unit decoding the code;

a bit plane generation unit generating a bit value in a range designated by the coefficient position information, using a decoding result, in a bit plane of the hierarchical level in the second layer, and setting bit values out of the designated range to 0, thereby generating the bit plane of the hierarchical level; and a restoration unit restoring a coefficient block by sequentially adding up a bit plane of each hierarchical level in the second layer.

7. A decoding device which receives and decodes data in a first layer, in a second layer, receives and decodes data, applies inversion of orthogonal transformation to an obtained coefficient, and adds an inversion result to a decoding result in the first layer, comprising:

a receiving unit receiving coefficient position information and a code of one hierarchical level in the second layer hierarchized by expanding the coefficient to a plurality of bit planes;

a decoding unit generating a plurality of block decoding results of the hierarchical level in the second layer by applying run-length decoding to the code;

a bit plane generation unit generating a bit value in a coefficient position designated by the coefficient position information, using the decoding results, in a bit plane of each block of the hierarchical level in the second layer, and setting bit values in positions other than the designated position to 0, thereby generating the bit plane of each block in the hierarchical level; and a restoration unit restoring a coefficient block by sequentially adding up a bit plane of each hierarchical level in the second layer.

8. A decoding device which receives and decodes data in a first layer, in a second layer, receives and decodes data, applies inversion of orthogonal transformation to an obtained coefficient and adds an inversion result to a decoding result in the first layer, comprising:

a receiving unit receiving both coefficient position information and a code of one hierarchical level in the second layer hierarchized by designating a coefficient position in each block;

a decoding unit decoding the code and dequantizing a decoding result;

a bit plane generation unit generating a value in a coefficient position designated by the coefficient position information using a dequantization result in each block of the hierarchical level in the second layer, and setting values in positions other than the designated position to 0, thereby generating each block of the hierarchical level; and a restoration unit restoring a coefficient block by sequentially adding up a block of each hierarchical level in the second layer.

9. A storage medium on which is recorded a hierarchical encoding program for an information processing device to encode and transmit data in a first layer, in a second layer, to calculate difference data between decoded data of the first layer and predetermined data, to divide the difference data into a plurality of blocks, to calculate a coefficient of each block by applying orthogonal transformation and to encode and transmit the coefficient, said hierarchical encoding program enabling the information processing device to perform:

hierarchizing the second layer by expanding the coefficient to a plurality of bit planes;

encoding a bit value in a coefficient position in a range designated by coefficient position information of one hierarchical level in the second layer, in a bit plane of the hierarchical level and generating a code; and transmitting the coefficient position information and code.

10. A storage medium on which is recorded a hierarchical encoding program for an information processing device to an information data in a first layer, in a second layer, to calculate difference data between decoded data of the first layer and predetermined data, to divide the difference data into a plurality of blocks, to calculate a coefficient of each block by applying orthogonal transformation and to an information the coefficient, enabling the information processing device to perform:

hierarchizing the second layer by expanding the coefficient to a plurality of bit planes;

detecting a bit value in a coefficient position designated by coefficient position information of one hierarchical level in the second layer, in a bit plane of each block in the hierarchical level;

applying run-length encoding to a bit value detected from a plurality of blocks and generating a code; and transmitting the coefficient position information and code.

11. A storage medium on which is recorded a hierarchical encoding program for an information processing device to an information data in a first layer, in a second layer, to calculate difference data between decoded data of the first layer and predetermined data, to divide the difference data into a plurality of blocks, to calculate a coefficient of each block by applying orthogonal transformation and to an information the coefficient, said hierarchical encoding program enabling the information processing device to perform:

extracting from each block of one hierarchical level in the second layer hierarchized by designating a coefficient position of each block, a value in a coefficient position designated by coefficient position information of the hierarchical level and quantizing the value;

encoding the quantized value and generating a code; and transmitting the coefficient position information and code.

12. A storage medium on which is recorded a hierarchical decoding program for an information processing device to receive and decode data in a first layer, in a second layer, to receive and decode data, to apply inversion of orthogonal transformation to an obtained coefficient and to add an inversion result to a decoding result in the first layer, said hierarchical decoding program enabling the information processing device to perform:

receiving coefficient position information and a code of one hierarchical level in the second layer hierarchized by expanding the coefficient to a plurality of bit planes;

decoding the code;

generating a bit value in a range designated by the coefficient position information using a decoding result, in a bit plane of the hierarchical level in the second layer, and setting bit values out of the designated range to 0, thereby generating the bit plane of the hierarchical level; and restoring a coefficient block by sequentially adding up a bit plane of each hierarchical level in the second layer.

13. A storage medium on which is recorded a hierarchical decoding program for an information processing device to receive and decode data in a first layer, in a second layer, to receive and decode data, to apply inversion of orthogonal transformation to a obtained coefficient and to add an inversion result to a decoding result in the first layer, said hierarchical decoding program enabling the information processing device to perform:

receiving coefficient position information and a code of one hierarchical level in the second layer hierarchized by expanding the coefficient to a plurality of bit planes;

generating a plurality of block decoding results of the hierarchical level in the second layer by applying run-length decoding to the code;

generating a bit value in a coefficient position designated by the coefficient position information using the decoding results, in a bit plane of each block of the hierarchical level in the second layer and setting bit values in positions other than the designated position to 0, thereby generating the bit plane of each block in the hierarchical level; and restoring a coefficient block by sequentially adding up a bit plane of each hierarchical level in the second layer.

14. A propagation signal for propagating a hierarchical decoding program for an information processing device to receive and decode data in a first layer, in a second layer, to receive and decode data, to apply inversion of orthogonal transformation to a obtained coefficient and to add an inversion result to a decoding result in the first layer, said hierarchical decoding program enabling the information processing device to perform:

receiving coefficient position information and a code of one hierarchical level in the second layer hierarchized by designating a coefficient position of each block;

decoding the code and dequantizing a decoding result;

generating a value in a coefficient position designated by the coefficient position information using a dequantization result, in each block of the hierarchical level in the second layer, and setting values in positions other than the designated position to 0, thereby generating each block of the hierarchical level; and restoring a coefficient block by sequentially adding up a block of each hierarchical level in the second layer.

15. A propagation signal for propagating a hierarchical encoding program for an information processing device to encode and transmit data in a first layer, in a second layer, to calculate difference data between decoded data of the first layer and predetermined data, to divide the difference data into a plurality of blocks, to calculate a coefficient of each block by applying orthogonal transformation and to encode and transmit the coefficient, said hierarchical encoding program enabling the information processing device to perform:

hierarchizing the second layer by expanding the coefficient to a plurality of bit planes;

encoding a bit value in a coefficient position in a range designated by coefficient position information of one hierarchical level in the second layer, in a bit plane of the hierarchical level and generating a code; and transmitting the coefficient position information and code.

16. A propagation signal for propagating a hierarchical encoding program for an information processing device to an information data in a first layer, in a second layer, to calculate difference data between decoded data of the first layer and predetermined data, to divide the difference data into a plurality of blocks, to calculate a coefficient of each block by applying orthogonal transformation and to an information the coefficient, enabling the information processing device to perform:

hierarchizing the second layer by expanding the coefficient to a plurality of bit planes;

detecting a bit value in a coefficient position designated by coefficient position information of one hierarchical level in the second layer, in a bit plane of each block in the hierarchical level;

applying run-length encoding to a bit value detected from a plurality of blocks and generating a code; and transmitting the coefficient position information and code.

17. A propagation signal for propagating a hierarchical encoding program for an information processing device to an information data in a first layer, in a second layer, to calculate difference data between decoded data of the first layer and predetermined data, to divide the difference data into a plurality of blocks, to calculate a coefficient of each block by applying orthogonal transformation and to an information the coefficient, said hierarchical encoding program enabling the information processing device to perform:

extracting from each block of one hierarchical level in the second layer hierarchized by designating a coefficient position of each block, a value in a coefficient position designated by coefficient position information of the hierarchical level and quantizing the value;

encoding the quantized value and generating a code; and transmitting the coefficient position information and code.

18. A propagation signal for propagating a hierarchical decoding program for an information processing device to receive and decode data in a first layer, in a second layer, to receive and decode data, to apply inversion of orthogonal transformation to an obtained coefficient and to add an inversion result to a decoding result in the first layer, said hierarchical decoding program enabling the information processing device to perform:

receiving coefficient position information and a code of one hierarchical level in the second layer hierarchized by expanding the coefficient to a plurality of bit planes;

decoding the code;

generating a bit value in a range designated by the coefficient position information using a decoding result, in a bit plane of the hierarchical level in the second layer, and setting bit values out of the designated range to 0, thereby generating the bit plane of the hierarchical level; and restoring a coefficient block by sequentially adding up a bit plane of each hierarchical level in the second layer.

19. A propagation signal for propagating a hierarchical decoding program for an information processing device to receive and decode data in a first layer, in a second layer, to receive and decode data, to apply inversion of orthogonal transformation to a obtained coefficient and to add an inversion result to a decoding result in the first layer, said hierarchical decoding program enabling the information processing device to perform:

receiving coefficient position information and a code of one hierarchical level in the second layer hierarchized by expanding the coefficient to a plurality of bit planes;

generating a plurality of block decoding results of the hierarchical level in the second layer by applying run-length decoding to the code;

generating a bit value in a coefficient position designated by the coefficient position information using the decoding results, in a bit plane of each block of the hierarchical level in the second layer and setting bit values in positions other than the designated position to 0, thereby generating the bit plane of each block in the hierarchical level; and restoring a coefficient block by sequentially adding up a bit plane of each hierarchical level in the second layer.

20. A propagation signal for propagating a hierarchical decoding program for an information processing device to receive and decode data in a first layer, in a second layer, to receive and decode data, to apply inversion of orthogonal transformation to a obtained coefficient and to add an inversion result to a decoding result in the first layer, said hierarchical decoding program enabling the information processing device to perform:

receiving coefficient position information and a code of one hierarchical level in the second layer hierarchized by designating a coefficient position of each block;

decoding the code and dequantizing a decoding result;

generating a value in a coefficient position designated by the coefficient position information using a dequantization result, in each block of the hierarchical level in the second layer, and setting values in positions other than the designated position to 0, thereby generating each block of the hierarchical level; and restoring a coefficient block by sequentially adding up a block of each hierarchical level in the second layer.

* * * * *